(12) United States Patent
Berger et al.

(10) Patent No.: US 9,100,301 B2
(45) Date of Patent: Aug. 4, 2015

(54) SYSTEMS, METHODS, AND ARTICLES OF MANUFACTURE TO MANAGE ALARM CONFIGURATIONS OF SERVERS

(75) Inventors: John Martin Berger, Saint Charles, MO (US); Allen Kirby, Suwanee, GA (US); Wayne Lappe, St. Louis, MO (US); David Kevin Leitson, Roswell, GA (US); Karen Swisher, Shawnee, KS (US); Daniel Gibson, New Boston, TX (US); David Wicks, Smyma, GA (US); Curtis Rugeley, Murphy, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 74 days.

(21) Appl. No.: 13/604,289

(22) Filed: Sep. 5, 2012

(65) Prior Publication Data

US 2014/0068033 A1    Mar. 6, 2014

(51) Int. Cl.
G06F 15/16 (2006.01)
H04L 12/24 (2006.01)
H04L 12/26 (2006.01)

(52) U.S. Cl.
CPC .......... *H04L 41/0813* (2013.01); *H04L 41/069* (2013.01); *H04L 41/0681* (2013.01); *H04L 41/0816* (2013.01); *H04L 41/0846* (2013.01); *H04L 41/0893* (2013.01); *H04L 43/16* (2013.01)

(58) Field of Classification Search
CPC . G06F 15/16; G06F 11/2069; G08B 13/1427; H04L 63/1408; H04L 63/0209; H04L 63/20
USPC ................................ 709/221; 340/539.1, 539
See application file for complete search history.

(56) References Cited

U.S. PATENT DOCUMENTS

| | | | |
|---|---|---|---|
| 6,141,699 A * | 10/2000 | Luzzi et al. ................... 719/331 |
| 7,225,249 B1 | 5/2007 | Barry et al. |
| 8,387,136 B2 * | 2/2013 | Lee et al. ........................ 726/20 |
| 2004/0058706 A1 * | 3/2004 | Williamson et al. .......... 455/557 |
| 2004/0130488 A1 * | 7/2004 | De Champlain .............. 342/374 |
| 2005/0149949 A1 * | 7/2005 | Tipton et al. ................... 719/321 |
| 2006/0282886 A1 * | 12/2006 | Gaug ................................. 726/5 |
| 2007/0040649 A1 * | 2/2007 | Dulgerian et al. ........... 340/5.64 |
| 2009/0045940 A1 * | 2/2009 | Sadana ....................... 340/539.1 |
| 2009/0125622 A1 | 5/2009 | O'Sullivan et al. |
| 2009/0259736 A1 * | 10/2009 | Chang et al. .................. 709/221 |
| 2012/0017096 A1 * | 1/2012 | Snider .......................... 713/189 |
| 2012/0030344 A1 | 2/2012 | Karenos et al. |
| 2012/0118044 A1 * | 5/2012 | Choi et al. .................... 73/31.03 |
| 2012/0119910 A1 * | 5/2012 | Belden et al. ............... 340/568.8 |
| 2014/0039833 A1 * | 2/2014 | Sharpe et al. ................. 702/183 |

* cited by examiner

*Primary Examiner* — Tesfay Yohannes
(74) *Attorney, Agent, or Firm* — Gardner Groff Greenwald & Villanueva, PC

(57) ABSTRACT

Systems, methods, and articles of manufacture to manage alarm configurations of servers are disclosed. An example system includes a processor, an alarm linkage database to store information representative of alarm configurations for a plurality of servers, and a memory comprising machine readable instructions. When executed, the instructions cause the processor to perform operations comprising accessing alarm configurations in the alarm linkage database for a subset of the plurality of servers in response to a first request, initiating a change in respective alarm configurations of the subset of the plurality of the servers, and initiating propagation of the alarm configuration to the subset of the servers, the subset including more than one server.

18 Claims, 20 Drawing Sheets

SYSTEMS, METHODS, AND ARTICLES OF MANUFACTURE TO MANAGE ALARM CONFIGURATIONS OF SERVERS

FIELD OF THE DISCLOSURE

This disclosure relates generally to network management, and, more particularly, to systems, methods, and articles of manufacture to manage alarm configurations of servers.

BACKGROUND

Modern communication networks include many mid-level servers to provide services and to service applications. Examples of such applications include customer service applications, virtual private network applications, and telephony services.

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
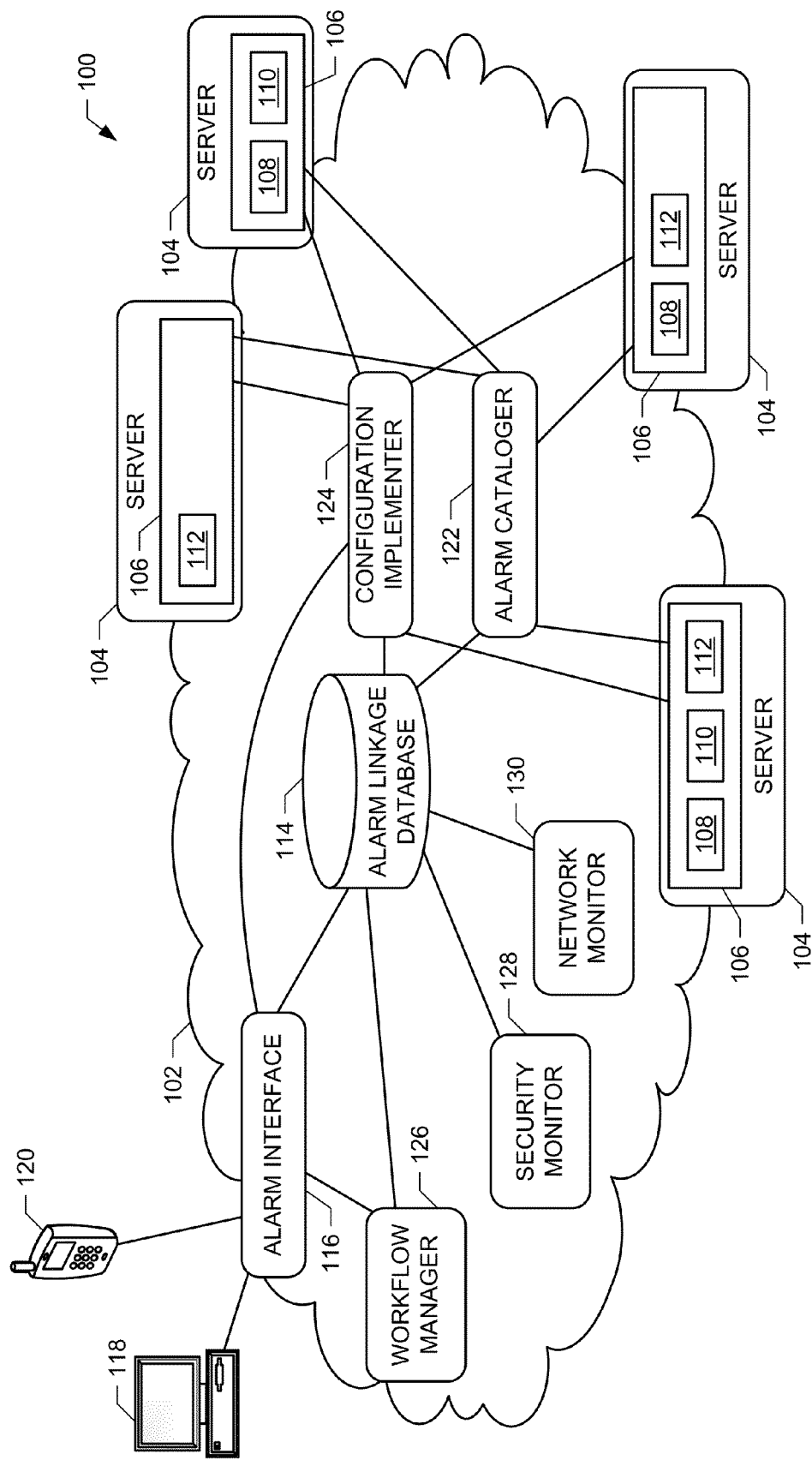
FIG. 1 is a block diagram of an example system constructed in accordance with the teachings of this disclosure to monitor servers in a network.

Example systems, methods, and articles of manufacture disclosed herein may be used to provide a unified system for managing (e.g., monitoring and/or modifying) alarm configurations on large numbers of servers in a network. In contrast to known networks of servers, in which changes to alarm configurations require manual changes to the monitoring agent on each individual server, example systems, methods, and articles of manufacture disclosed below enable a user of the network to initiate creation, modification, and/or deletion of multiple alarm configurations to multiple servers at the same time. In contrast to the tedious, time-consuming, and error-prone manual configuration processes performed in known networks of servers, example systems, methods, and articles of manufacture enable users to rapidly and accurately define and initiate the implementation of alarm configurations to large numbers of servers.

Some example systems, methods, and articles of manufacture disclosed herein are particularly useful in large-scale systems (e.g., systems involving hundreds or thousands of servers), in which multiple servers perform the same functions (e.g., collectively provide a service) and may benefit from being monitored using similar or identical alarm configurations. For example, if a particular type of server fails and the alarm configuration for the server did not properly warn of the potential failure condition, it may be desirable to correct the alarm configuration of the other ones of that type of server for the potential failure condition in the future. Furthermore, it may be desirable to monitor all other servers of the same type for the same condition(s). Using the example systems, methods, and articles of manufacture disclosed herein, the person(s) responsible for monitoring the type of server can easily define the desired type of monitor(s) and/or alarm thresholds, define the desired servers to which the monitor(s) are to be applied, and initiate the configuration of the servers to implement the monitor(s). A prior art system would require that each server be individually configured with the desired configuration which, in a system including hundreds or thousands servers, can be labor-intensive and error-prone.

In some examples, alarm configurations are collected and stored in an alarm configuration database. Users of the network may access the alarm configuration database via an alarm interface to view alarm configurations for servers. In some examples, alarm configurations are organized according to monitor profiles, which may be stored in a profile database in the alarm linkage database. Users may create, modify, and/or delete monitor profiles and organize assignments of monitors to servers in a monitor profile. Example alarm linkage databases include a monitor database to store monitors, monitor groups, and/or assignments of monitors and/or monitor groups to servers and/or server groups.

In some examples, users may define monitors using knowledge modules, which represent a particular type of object to be monitored. Examples of knowledge modules include knowledge modules for file systems, daemon processes, log files, etc. In some examples, the knowledge modules include knowledge modules associated with the BMCPatrol monitoring tool, the Amity monitoring tool, and/or the Sitescope monitoring tool. The knowledge modules of some examples include procedures and/or data used by monitors to monitor corresponding types of server. In some examples, each knowledge module contains data specific to the knowledge module and data common to multiple knowledge modules (e.g., workflow management).

In some examples, monitors are based on knowledge modules and further include data and/or processes to be monitored, additional processes, alarm thresholds, actions to be taken, parties to be notified, and/or other alarm information. Some example systems, methods, and articles of manufacture disclosed herein organize monitors into monitor groups as defined in a monitor profile. Monitor profiles can define multiple monitor groups. Monitor groups may be used when, for example, a set of identical monitors are to be assigned (e.g. web server monitors, database monitors) to one or more servers. Monitor groups can include monitors based on different knowledge modules. Additionally, each monitor group may be assigned to multiple different server groups. Such assignment advantageously enables multiple monitors to be associated with multiple servers without having to repetitively enter the monitoring configuration for the servers.

Example systems, methods, and articles of manufacture disclosed herein enable the servers in a network to be organized into server groups as defined in a monitor profile. In some examples, a server may be included in multiple server groups (e.g., server groups may overlap).

In some examples, users use an alarm interface to initiate a request to assign a monitor group (e.g., including multiple monitors) to one or more servers (e.g., to a server group), assign a monitor to one or more servers (e.g., to a server group), and/or assign a monitor group to a server group. When a monitor group is assigned to a server group, each of the monitors in the monitor group are assigned (e.g., applied) to each of the servers in the server group.

In some examples, the monitor database stores a single-server type of monitor group. Single-server monitor groups specify a single server name for each monitor in the monitor group and are not to be linked to server groups. Single-server monitor groups are defined for monitors that only apply to a single server. As a result, the single-server monitor groups eliminate the overhead of creating a monitor group and server group with only one entry each.

Example systems, methods, and articles of manufacture disclosed herein include an alarm cataloger to populate the alarm linkage database with alarm configuration information for monitored servers in a network. Example alarm catalogers collect (or cause to be collected) the alarm configuration information for each monitored server by, for example, instructing a monitoring agent on the server to provide identifiers of monitors, monitored parameters, and/or alarm thresholds to the alarm linkage database. In some examples, the monitoring agent collects the requested information and assembles the information into a standardized package for transmission to the alarm linkage database.

In some such examples, the example alarm linkage database receives the standardized package, verifies the information in the package, and creates and/or updates a monitor database and/or a server database according to the information. In some examples, a monitor record is created in the monitor database when a new monitor is found (e.g., during an initial transition or setup period for the alarm linkage database). In some examples, a server record is created in the monitor database when a new server is found. In some examples, monitor records and/or server records are updated based on changes requested by users via the alarm interface.

As used herein, an "alarm" refers to an alert or other notification generated by a monitoring agent monitoring a server in response to a set of one or more operating conditions traversing one or more threshold values. For example, an alarm may be generated by a monitoring agent in response to a workload capacity of a monitored server exceeding a threshold.

FIG. 1 is a block diagram of an example system 100 to monitor servers in a network 102. The example system 100 of FIG. 1 may be used to monitor and/or change alarm configurations for multiple servers 104 and, in some examples, may be used to improve management of alarm configurations for large numbers of servers in the network 102 (e.g., hundreds, thousands, tens of thousands, or more).

The example network 102 of FIG. 1 may be any type and/or combination of types of communications network(s). The example servers 104 of FIG. 1 may be physical servers and/or virtual servers operating on physical servers (e.g., application servers that provide service(s) to users). One or more of the servers 104 may be of the same type or purpose, such as a cluster of servers configured to provide a set of identical services.

Each of the example servers 104 of FIG. 1 is provided with a corresponding monitoring agent 106. The monitoring agents 106 monitor the servers 104 for defined parameters and to determine whether any operating condition(s) of the servers 104 traverse one or more alarm thresholds (e.g., exceed, fall below, enter a range, exit a range, etc.). Based on the type of server 104 (e.g., the function of the server 104, the services provided by the server 104, etc.), the monitoring agents 106 are assigned respective monitors 108, 110, 112. The monitors 108, 110, 112 define the parameters and/or the alarm thresholds to be monitored. Additionally or alternatively, the monitors 108, 110, 112 may define actions to be taken in response to an alarm, a party responsible for the presence and/or maintenance of the monitor 108, 110, 112, and/or any other parameter associated with the purpose, function, and/or relationships of the monitor 108, 110, 112.

The example system 100 of FIG. 1 includes an alarm linkage database 114 to store monitor information, server information, and/or profile information. The example alarm linkage database 114 stores the alarm configurations of the servers 104, including information about the monitors 108, 110, 112 and/or their relationships (e.g., assignments) to the servers 104.

To enable users to effectively navigate large numbers of alarm configurations, the example alarm linkage database 114 further stores profile information. Users of the example system 100 are permitted to define and store monitor profiles (also referred to herein as simply "profiles"). For example, a user may choose to define and store a monitor profile for each type of application or service a user is responsible for managing. A user may choose to define and/or store different monitor profiles for managing alarm configurations for different geographic regions or according to any other desired arrangement.

To enable users to access the alarm linkage database 114 (e.g., to create, modify, and/or delete monitors, monitor-to-server assignments, and/or monitor profiles, the example system 100 includes an alarm interface 116. The example alarm interface 116 provides an interface via which user devices 118, 120 may view and initiate modifications to alarm configurations in the alarm linkage database 114. In the example of FIG. 1, the alarm interface 116 receives requests to view and/or modify alarm configuration information (e.g., from the devices 118, 120) and retrieves the requested information from the alarm linkage database and/or initiates the requested updates to the alarm configurations of the servers 104 (e.g., via the configuration implementer 124). The example alarm interface 116 of FIG. 1 provides users with a web interface (e.g., a series of web pages displaying requested information based on user actions).

The example system 100 of FIG. 1 further includes an alarm cataloger 122. The example alarm cataloger 122 of FIG. 1 extracts alarm configurations from the monitoring agents 106 executing on the servers 104. In some examples, the alarm cataloger 122 extracts an alarm configuration by instructing a monitoring agent 106 to generate a package including the alarm configuration information and to send the package to the alarm cataloger 122 and/or to the alarm linkage database 114. For example, the package may be a text file or an eXtensible Markup Language (XML) document. The package may be standardized to facilitate processing of the same.

The example alarm cataloger 122 of FIG. 1 may be scaled to collect and provide alarm configuration information for very large numbers of servers (e.g., hundreds, thousands, tens of thousands, hundreds of thousands, or more) to the alarm linkage database 114. In combination with the alarm linkage database 114 and the alarm interface 116, the example alarm cataloger 122 enables the organization and modification of alarm configuration information by a user for networks including, for example, very large networks of very large numbers of servers.

In the example of FIG. 1, the alarm cataloger 122 receives the extracted alarm configuration (e.g., the package) and converts the alarm configuration to information to be stored in the alarm linkage database 114. In some examples, the alarm cataloger 122 verifies that the alarm configuration information is in a proper format and does not have any errors (e.g., syntax errors, unrecognized tags, etc.). A more detailed example of the collection and processing of alarm configuration information by the alarm cataloger 122 is provided below.

When the alarm interface 116 of the illustrated example initiates a request to change an alarm configuration, the alarm interface 116 provides the request to a configuration implementer 124. The example configuration implementer 124 receives requests to change alarm configurations of the servers 104 and implements the changes to the alarm configurations. When the changes have been implemented, the example configuration implementer 124 updates the alarm linkage database 114 with the updated alarm configuration for the affected servers 104. In this manner, the example alarm linkage database 114 is provided with current and accurate alarm configurations of the servers 104. In some examples, the configuration implementer 124 updates the alarm linkage database 114 with intermediate alarm configurations when a request has been submitted but before the request has been implemented. For example, the configuration implementer 124 may submit a requested alarm configuration, a pending alarm configuration, a canceled alarm configuration, a rejected alarm configuration, and/or any other intermediate alarm configuration to the alarm linkage database 114.

In some examples, the configuration implementer 124 implements a configuration and/or a change to a configuration by interfacing with the servers 104 (e.g., the monitoring agents 106 on the servers 104) to configure new monitor(s) 108-112, delete monitor(s) 108-112, and/or edit the monitors 108-112. For example, the configuration implementer 124 may translate an updated configuration into a set of commands and/or parameters to update the monitoring agents 106 of the affected servers 104 and/or may generate an updated configuration file to replace a configuration of the monitoring agent (e.g., completely replace the alarm configurations of affected servers).

The example system 100 of FIG. 1 further includes a workflow manager 126 to manage workflows associated with changing alarm configurations. For example, when a user submits a request to change an alarm configuration (e.g., via the alarm interface 116) to the alarm linkage database 114, the example workflow manager 126 creates a workflow for the requested change. The workflow is stored in the example alarm linkage database 114 and may be updated by, for example, the alarm cataloger 122 and/or the configuration implementer 124 based on the progress of the workflow. The example alarm interface 116 may access the workflow manager 126 to determine, for example, a status of workflows for a user, for a monitor profile, for a server, for a monitor, for a server group, and/or for a monitor group.

The example system 100 of FIG. 1 further includes a security monitor 128 to manage security configurations of the example servers 104. In some examples, the security monitor 128 provides alarm configurations pertaining to security aspects of the network 102 to the alarm linkage database 114. The security alarm configurations may be accessed and/or modified via the example alarm interface 116. In some examples, the alarm configurations stored and/or modified via the security monitor 128 are implemented via security knowledge modules.

The example system 100 of FIG. 1 further includes a network monitor 130. The example network monitor 130 monitors alarm configurations for networking aspects of the network 102 (e.g., routers, etc.) and stores the alarm configurations in the alarm linkage database 114. The networking alarm configurations may be accessed and/or modified via the alarm interface 116 in a manner similar to the example alarm configurations for the servers 104. In some examples, the alarm configurations stored and/or modified via the network monitor 130 are implemented via networking knowledge modules.

Figure 2:
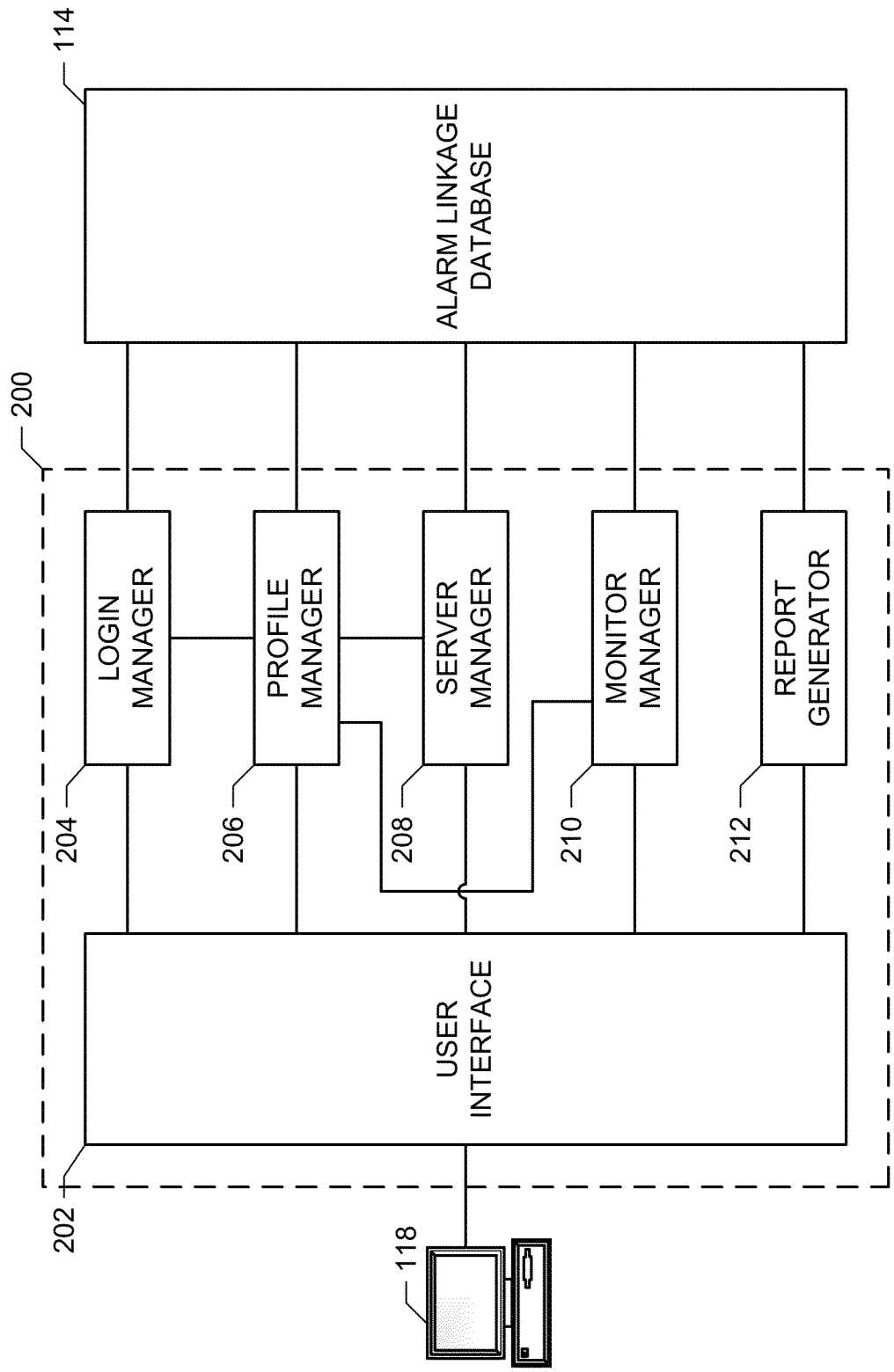
FIG. 2 is a block diagram of an example implementation of the alarm interface of FIG. 1.

FIG. 2 is a block diagram of an example alarm interface 200. The example alarm interface 200 may implement the alarm interface 116 of FIG. 1 to provide an interface to an alarm linkage database and/or to initiate changes to alarm configurations. The example alarm interface 200 of FIG. 2 communicates with the alarm linkage database 114 of FIG. 1, and includes a user interface 202, a login manager 204, a profile manager 206, a server manager 208, a monitor manager 210, and a report generator 212.

The example user interface 202 of FIG. 2 provides users with an interface to enter requests and to receive alarm configurations. In some examples, the user interface 202 generates and provides alarm information to users via web pages using hypertext transfer protocol (HTTP). Similarly, in some examples, the user interface 202 receives requests via user inputs to a web page (e.g., via the computer 118 or another type of device) that are submitted to the user interface 202 via HTTP. In some other examples, the user interface 202 provides an API that may be accessed by standalone software applications and/or may be linked by other web services. The example user interface 202 includes necessary hardware and/or software services to dynamically generate and deliver the web pages (or provide any other type of interface such as an API) to the computer 118 or other device.

The example login manager 204 of FIG. 2 receives login credentials from a user via the user interface 202. Example login credentials may include a user identification and password, an employee number, a secure token, or any other type of credentials. The example login manager 204 of FIG. 2 authenticates received credentials by querying the example alarm linkage database 114.

Figure 3:
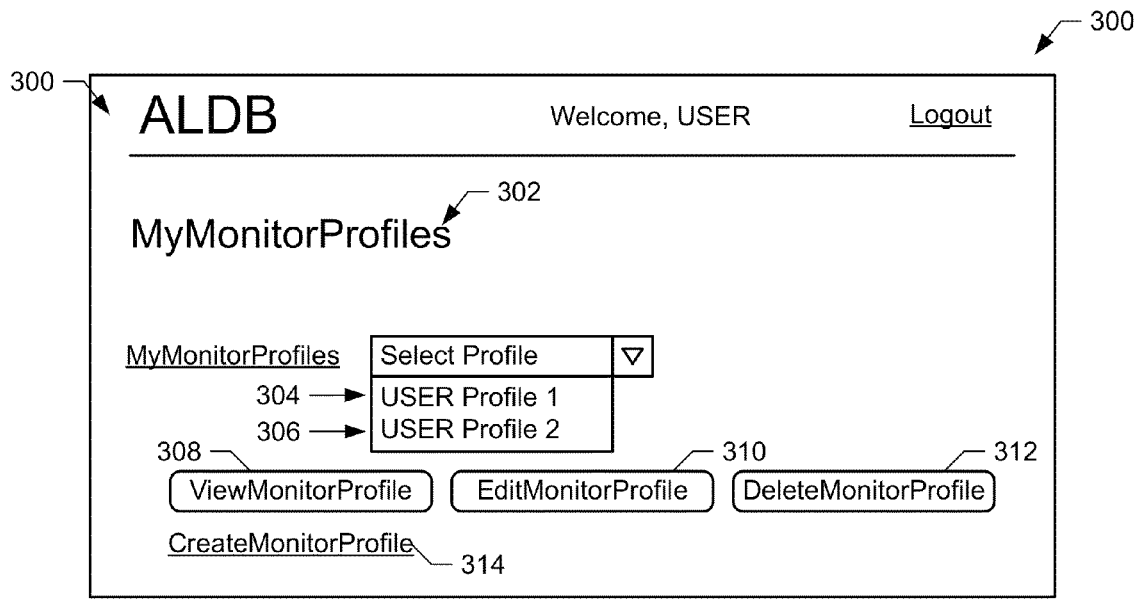
FIG. 3 illustrates an example web page presented upon logging into the alarm interface of FIG. 2.

FIG. 3 illustrates an example web page presented upon logging into the alarm interface 200 (e.g., via the user interface 202 and/or the login manager 204 of FIG. 2). The example web page 300 includes a navigation guide 302 to indicate to the user his or her navigation status (e.g., an indication of the type of information that is being presented in the current web page 300).

Based on the login manager 204 receiving authenticated credentials, the example profile manager 206 of FIG. 2 retrieves monitor profiles 304, 306 belonging to the user (e.g., monitor profiles which the user created and/or of which the user is considered an owner) and/or monitor profiles which the user has permissions to view. The monitor profiles 304, 306 are used to organize assignments of monitors to servers in the network (e.g., the monitors 108-112 on the servers 104 in the example network 102 of FIG. 1). In some examples, the user enters default settings into one or more monitor profiles 304, 306. When a monitor profile 304, 306 including default settings is selected, appropriate ones of the default settings of the monitor profile 304, 306 are automatically used when a new monitor, a new monitor group, and/or a new server group are created for the monitor profile 304, 306. In the illustrated example, a user may create any number of monitor profiles 304, 306. The example profile manager 206 presents the monitor profiles 304, 306 to the user via the user interface 202 for selection (e.g., in a dropdown or selection object). When the user selects a monitor profile (e.g., the profile 304) via the user interface 202, the user may select a "ViewMonitorProfile" button 308 to request an interface to view alarm configuration information associated with the monitor profile 304, an "EditMonitorProfile" button 310 to request an interface to edit information associated with the monitor profile 304, and/or a "DeleteMonitorProfile" button 312 to delete the selected monitor profile 304. The example profile manager 206 further presents a "CreateMonitorProfile" link or button 314 to request an interface to create a new monitor profile.

Figure 4:
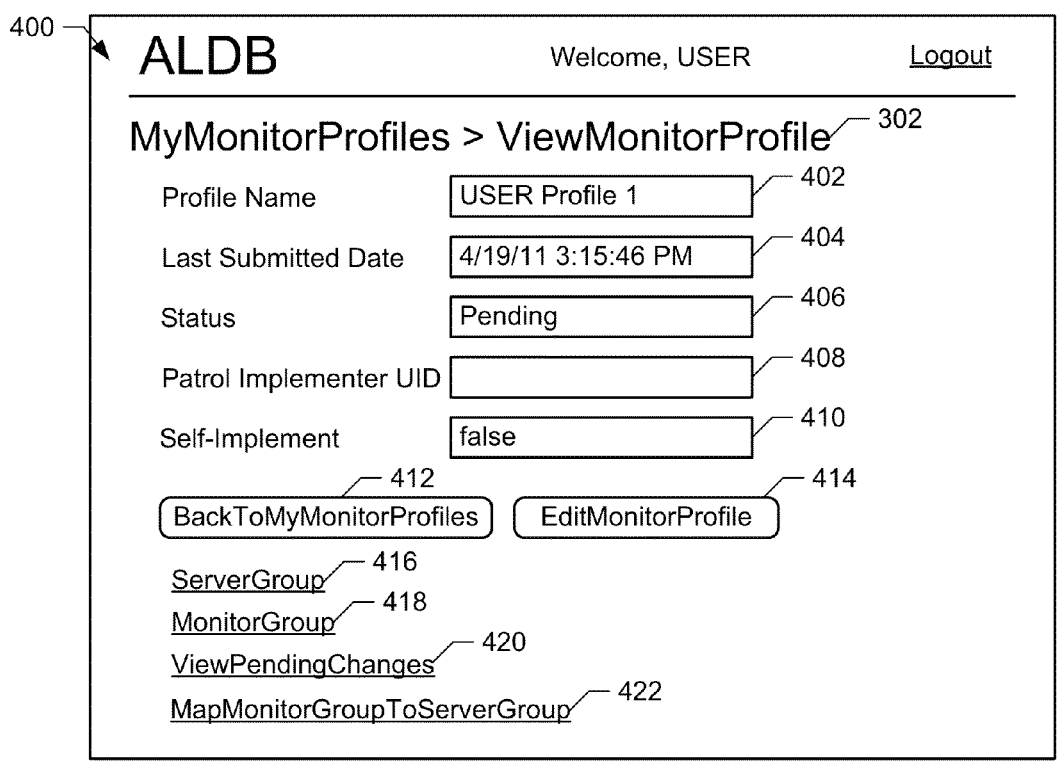
FIG. 4 illustrates an example web page presented in response to a request to view a monitor profile.

FIG. 4 illustrates an example web page 400 presented via the user interface 202 in response to a request to view a monitor profile. For example, the profile manager 206 of FIG. 2 presents the example web page 400 when a user selects the monitor profile 304 and then selects the "ViewMonitorProfile" button 308. The example web page 400 includes information regarding a current status of the selected monitor profile 304. The example information is retrieved by the profile manager 206 from the alarm linkage database 114 of FIGS. 1 and 2, and includes a name of the selected monitor profile 402, a most recent modification date of the selected monitor profile 404, a status of any requested changes to the selected monitor profile 406, a user identification of an implementer of the requested changes 408 (e.g., if the requested changes have been implemented), and an indication of whether requested changes to the selected monitor profile may be self-implemented (e.g., implemented by the user and/or by the configuration implementer 124 of FIG. 1).

The example web page 400 further includes a "BackToMyMonitorProfile" button 412 to request an interface to view and/or select the monitor profiles associated with the login credentials (e.g., to navigate to the web page 300) and an "EditMonitorProfile" button to request an interface to edit the selected monitor profile 304. The example web page 400 of FIG. 4 includes a "ServerGroup" link or button 416 to request an interface to view server group(s) associated with the selected monitor profile 304. The example web page 400 also includes a "MonitorGroup" link or button 418 to request an interface to view monitor groups and/or assignments of monitor group(s) (including single-server monitor groups) to server(s) and/or server group(s). A "ViewPendingChanges" link or button 420 enables a user to request an interface to view pending changes to the selected monitor profile 304, changes to monitor group(s), changes to server group(s), and/or changes to assignments of monitor group(s) to server group(s).

The example web page 400 includes a link or button 422 to cause the monitor manager 210 to map one or more monitor group(s) associated with the selected monitor profile 304 to one or more server group(s).

Returning to FIG. 2, the example server manager 208 assigns one or more of the servers 104 to respective server group(s). The example alarm linkage database 114 stores the server group(s), including identification(s) of the servers in the server group(s). The example server manager 208 receives requests to create a server group, edit a selected server group, view a selected server group, and/or delete a selected server group via the user interface 202. In response to a request specifying an existing server group (e.g., edit, view, delete), the example server manager 208 accesses the specified (e.g., selected) server group from the alarm linkage database 114. Additionally, the example server manager 208 stores updates to server groups and/or server group information (e.g., for newly-created server groups) in the alarm linkage database 114.

When a server group is modified, the example server manager 208 modifies the assignments of monitor group(s) assigned to the server group. For example, if a server is added to the server group, the monitors in the monitor group(s) that are assigned to the server group are assigned to the added server. Similarly, if a server is removed from the server group, the monitors in the monitor groups that are assigned to the server group are unassigned from the removed server (unless assigned to the server via another monitor group to server group assignment).

Figure 5:
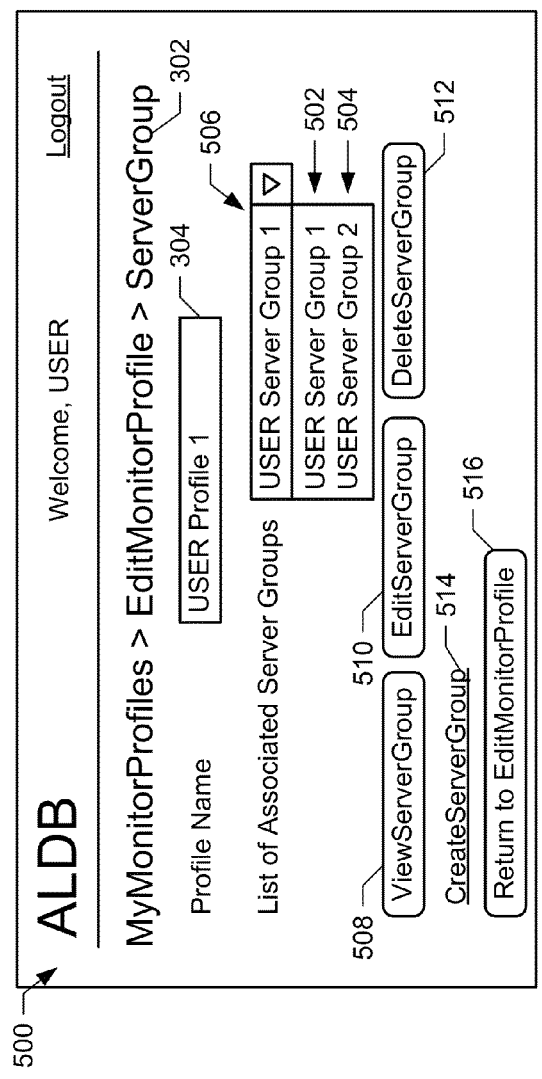
FIG. 5 illustrates an example web page presented in response to a request to view server groups associated with a selected monitor profile.

FIG. 5 illustrates an example web page 500 presented via the user interface 202 of FIG. 2 in response to a request to view server groups associated with a selected monitor profile (e.g., the monitor profile 304 of FIG. 3). The example web page 500 may be presented to a user based on a selection of the "ServerGroups" link or button 416 of FIG. 4. In response to a selection of the "ServerGroups" link 416, the example server manager 208 retrieves any server group(s) associated with the selected monitor profile 304. The retrieved server group(s) (e.g., server groups 502, 504) are presented in a selection menu 506 (e.g., a dropdown box).

The example web page 500 includes a "ViewServerGroup" button 508 which, when selected, causes the server manager 208 to retrieve information from the alarm linkage database 114 for the selected server group (e.g., the server group 502), such as assignments of monitor groups to the selected server group 502 and/or pending changes to the selected server group 502. The example web page 500 also includes an "EditServerGroup" button 510 which, when selected, causes the server manager 208 to present an interface (e.g., a web page) to enable the user to edit the servers in the selected server group 502 and/or edit other information for the selected server group 502. A "DeleteServerGroup" button 512, when selected, causes the example server manager 208 to request that the alarm linkage database 114 delete the selected server group 502.

The example web page 500 further includes a "CreateServerGroup" link or button 514 which, when selected, causes the server manager 208 to present a server group creation interface to the user (e.g., via the user interface 202). The example server manager 208 populates some or all of the information associated with the newly-created server group based on the selected monitor profile (e.g., defaults stored in the monitor profile). The example server manager 208 may send a request to the profile manager 206 in response to a user selecting a "ReturnToEditMonitorProfile" button 516 to cause the profile manager 206 to present the selected monitor profile 304 and/or information associated with the selected monitor profile 304 in a web page.

Figure 6:
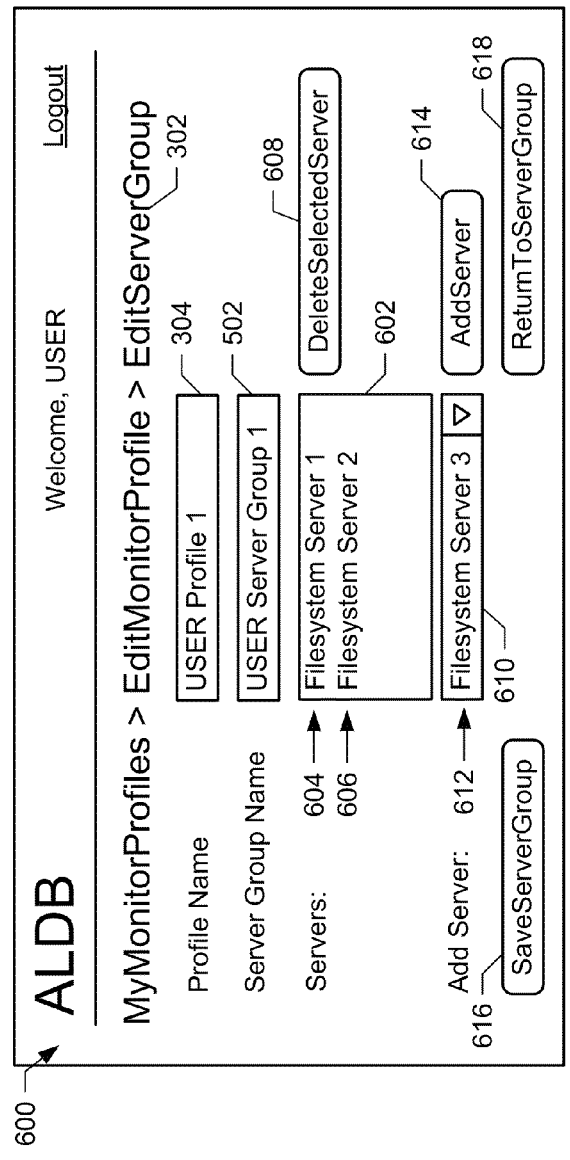
FIG. 6 illustrates an example web page presented in response to a request to edit a server group.

FIG. 6 illustrates an example web page 600 presented to a user in response to a request to edit a server group. The example server manager 208 of FIG. 2 may present the example web page 600 via the user interface 202 when the "EditServerGroup" button 510 of FIG. 5 is selected in association with the selected server group 502.

The example server manager 208 presents the selected monitor profile 304 and the name of the selected server group 502 in the web page 600. The example server manager 208 further presents a selection object 602 listing the servers 604, 606 that are assigned to the selected server group 502 as of the most recent request from the server manager 208 to the alarm linkage database 114. The example web page 600 includes a "DeleteSelectedServer" button 608 which, when selected, causes the server manager 208 to remove selected servers 604, 606 from the selection object 602. In some examples, selection of the button 608 causes the server manager 208 to initiate a request to update the alarm linkage database 114 by removing selected servers 604, 606 from the selected server group 502. In some other examples, the button 608 causes the desired change to be reflected on the web page 600, while actual updating of the selected server group 502 does not occur unless and until a request is made to save changes to the server group 502 as discussed below.

The example web page 600 further includes a selection menu 610 including selectable servers 612 (e.g., any server in the network, particular types of servers in the network, servers that are accessible based on the selected monitor profile 304, servers that are accessible based on the authenticated user, etc.). In some examples, the server manager 208 enables a user to search for or otherwise rapidly locate or identify a particular server (e.g., when a scrolling list of servers would be impracticable). For example, the server manager 208 may accept a text string indicative of a name of a server. Upon selecting or otherwise inputting a server, a user may select an "AddServer" button 614 to cause the server manager 208 to initiate a request (e.g., to the alarm linkage database 114) to update the selected server group 502 by adding the selected server 612.

In the illustrated example web page 600, the server manager 208 presents a "SaveServerGroup" button 616 to initiate a request to change the selected server group 502. Thus, the example server manager 208 may initiate multiple changes input via the web page 600 instead of making multiple requests (e.g., initiating a request to update the server group 502 each time a button 608, 614 is selected). The example web page 600 further includes a "ReturnToServerGroup" button 618 which, when selected, causes the server manager 208 to display the server groups (e.g., in the web page 500 shown in FIG. 5.)

Figure 7:
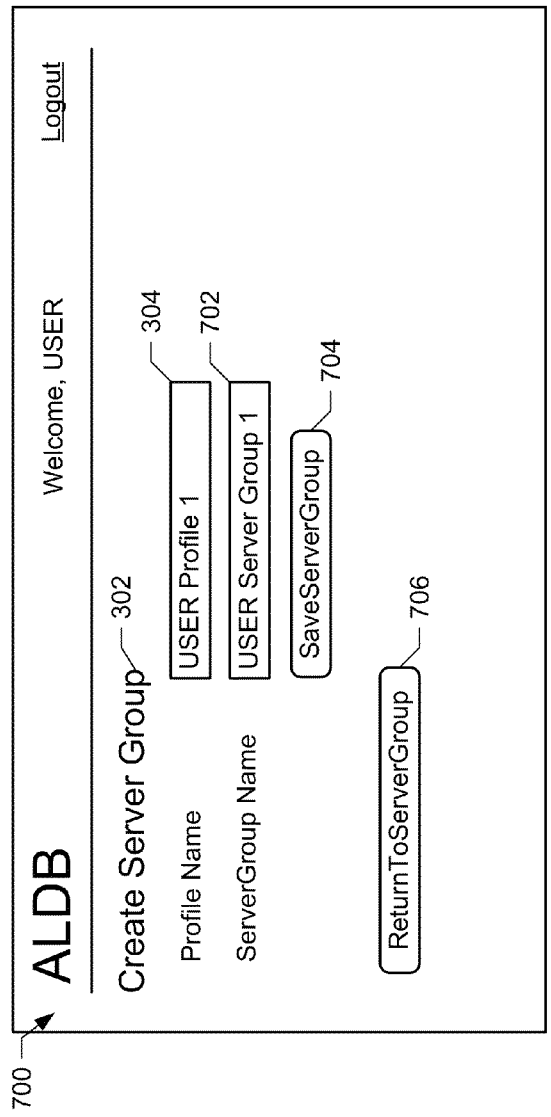
FIG. 7 illustrates an example web page presented in response to a request to create a server group.

FIG. 7 illustrates an example web page 700 presented to a user in response to a request to create a server group. The example server manager 208 of FIG. 2 may present the example web page 700 via the user interface 202 when the "CreateServerGroup" link or button 514 of FIG. 5 is selected in association with the selected server group 502.

The example server manager 208 presents the selected monitor profile 304. A name 702 of the server group to be created is entered in the web page 700. The example web page 700 includes a "SaveServerGroup" button 704. The server manager 208 stores a new server group in the alarm linkage database 114. The example web page 700 further includes a "ReturnToServerGroup" button 706 to cause the server manager 208 to present the list of server groups (e.g., display the web page 500 of FIG. 5).

Returning to FIG. 2, the example monitor manager 210 requests information about monitors and monitor groups from the alarm linkage database 114 based on a selected monitor profile. The example monitor manager 210 generates requests to create monitors and/or monitor groups, edit monitors and/or monitor groups, delete monitors and/or monitor groups, and/or assign monitor groups to server groups. For example, the monitor manager 210 initiates requests to add and/or remove monitors from a monitor group. In some examples, a monitor group may be implemented as a single-server monitor group, which has a single server specified in the properties of the monitor group, to avoid overhead associated with setting up a server group for a single monitor.

The monitor manager 210 also initiates requests to assign monitor groups to server groups and/or unassign monitor groups to server groups. The monitor groups and the assignments of monitor groups to server groups are stored as alarm configurations in the alarm linkage database 114 and are updated by the monitor manager 210 in response to requests via the user interface 202. Using the monitor manager 210, the example alarm interface 200 enables a user to rapidly make changes to alarm configurations of large numbers of servers in a network (e.g., the servers 104 in the network 102 of FIG. 1).

When a monitor group is modified, the example monitor manager 210 modifies the alarm configurations of the server group(s) to which the monitor group is assigned. For example, if a monitor is added to the monitor group, the monitor is assigned to each server in each of the server groups to which the monitor group is assigned. Similarly, if a monitor is removed from the monitor group, that monitor is removed from each server in each of the server groups to which the monitor group is assigned.

Figure 8:
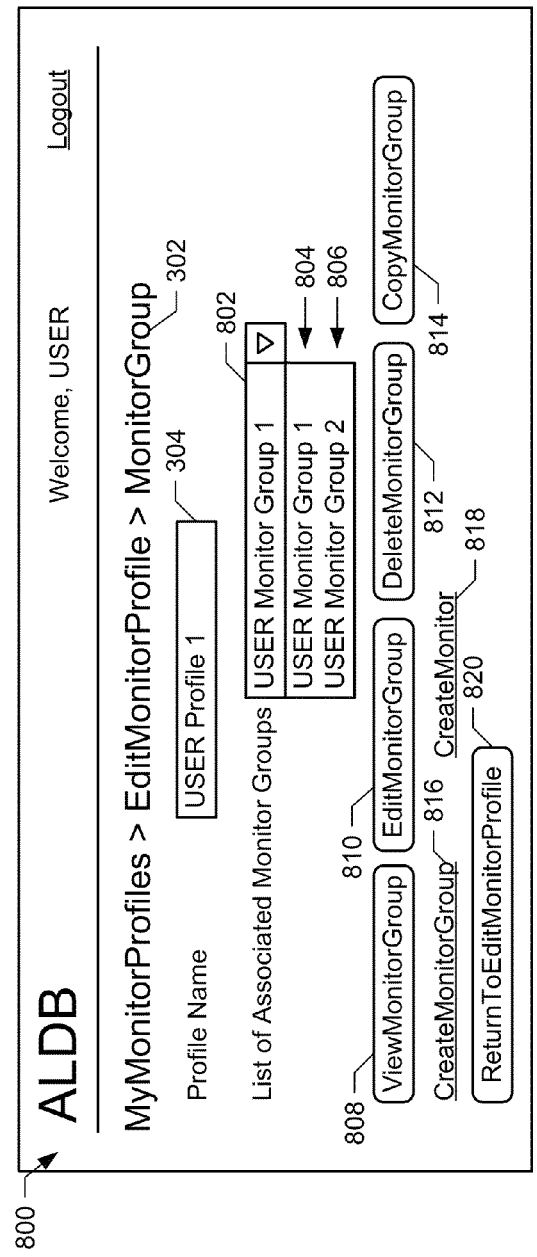
FIG. 8 illustrates an example web page presented in response to a request to view monitor groups associated with a selected monitor profile.

FIG. 8 illustrates an example web page 800 presented to a user in response to a request to view monitor groups associated with a selected monitor profile 304. The example monitor manager 210 may present the web page 800 to a user via the user interface 202 of FIG. 2 in response to selection of a "MonitorGroup" link or button such as the "MonitorGroup" link 418 in the web page 400 of FIG. 4.

To display the example web page 800, the example monitor manager 210 retrieves monitor group information associated with the selected monitor profile 304 from the alarm linkage database 114. The example monitor manager 210 presents a selection menu 802 that includes monitor groups 804, 806 associated with the selected profile. A monitor group 804, 806 may be selected using the selection menu (e.g., via the user interface 202).

The example web page 800 includes a "ViewMonitorGroup" button 808 which, when selected, causes the monitor manager 210 to retrieve information associated with the selected monitor group (e.g., the monitor group 804) and present the information via the user interface 202. The example web page 800 includes an "EditMonitorGroup" button 810 which, when selected, causes the monitor manager 210 to retrieve information associated with the selected monitor group 804 and present an interface to enable modification of the selected monitor group 804 (e.g., modifying monitors included in the monitor group). In some examples, the information retrieved in response to selection of the "ViewMonitorGroup" button 808 is not identical to the information retrieved in response to selection of the "EditMonitorGroup" button 810.

The example web page 800 further includes a "Delete-MonitorGroup" button 812 which, when selected, causes the monitor manager 210 to request that the alarm linkage database 114 delete the selected monitor group 804. The web page 800 includes a "CopyMonitorGroup" button 814 which, when selected, causes the monitor manager 210 to create a new monitor group having identical characteristics as the selected monitor group 804, except as to a name of the newly-created monitor group. To copy a selected monitor group 804, the example monitor manager 210 requests information associated with the selected monitor group 804 and then requests that the alarm linkage database 114 to store a new monitor group having the same monitors and the same characteristics except as to name. In some examples, the monitor manager 210 generates the name of the newly-created monitor group by appending "_COPY" or another string to the name of the selected monitor group 804. The example monitor manager 210 presents an interface to modify the newly-created monitor group (e.g., similar to the interface presented when the "EditMonitorGroup" button 810 is selected).

The example web page 800 includes a "CreateMonitorGroup" link or button 816. Selection of the "CreateMonitorGroup" link or button 816 causes the example monitor manager 210 to create a new monitor group and store the newly-created monitor group in the alarm linkage database 114. The example monitor manager 210 generates the monitor group using default settings specified by the selected monitor profile 304. The example monitor manager 210 further presents interface to modify the newly-created monitor group (e.g., similar to the interface presented when the "EditMonitorGroup" button 810 is selected). The example web page 800 also includes a "CreateMonitor" button 818 to cause the monitor manager 210 to present an interface (e.g., a web page) to create a new monitor to be associated with the selected monitor profile 304.

A "ReturnToEditMonitorProfile" button 820 causes the profile manager 206 to present information via the user interface 202 to enable the user to edit the selected monitor profile 304. In some examples, the "ReturnToEditMonitorProfile" button 820 is replaced or supplemented by a button to cause the profile manager 206 to present an interface to view the information associated with the selected monitor profile 304 (e.g., the web page 400 of FIG. 4).

Figure 9:
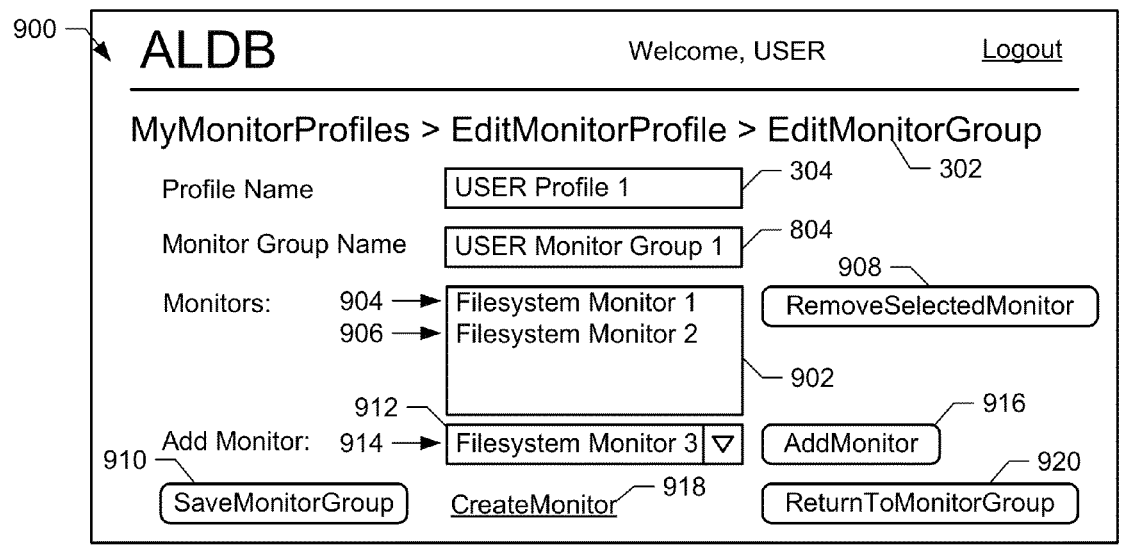
FIG. 9 illustrates an example web page presented in response to a request to edit a selected monitor group.

FIG. 9 illustrates an example web page 900 presented to a user in response to a request to edit a selected monitor group. The example monitor manager 210 presents the web page 900 via the user interface 202 in response to, for example a selection of the "EditMonitorGroup" button 810 of FIG. 8. To present the web page 900, the example monitor manager 210 retrieves information associated with the selected monitor group 804 from the alarm linkage database 114.

The example web page 900 of FIG. 9 includes a selection object 902, which includes a listing of monitors 904, 906 belonging to the selected monitor group 804 (e.g., determined from the alarm linkage database 114). Any of the example monitors 904, 906 may be selected in the selection object 902. A "RemoveSelectedMonitor" button 908, when selected, causes the monitor manager 210 to remove selected monitors 904, 906 from the selected monitor group 804. In some examples, the monitor manager 210 requests removal of selected monitors 904, 906 when the button 908 is selected. In some other examples, the monitor manager 210 removes the selected monitors 904, 906 from the selection object 902, but does not request the removal of the selected monitors 904, 906 from the selected monitor group 804 until a save request is made (e.g., via a "SaveMonitorGroup" button 910).

The example web page 900 includes a selection menu 912 including monitors 914 that may be added to the selected monitor group 804. In some examples, the monitors listed in the selection menu 912 are limited to particular types of monitors (e.g., types of monitors specified by the selected monitor group 804). In some other examples, any monitor(s) that are accessible to the selected monitor profile 304 and/or to the authenticated user are listed in the selection menu 912. In some examples, the selection menu 912 is augmented or replaced by a text field to enable specifying and/or searching for monitors (e.g., when a number of monitors would be impractical to list in a selection menu such a drop down menu).

When a monitor 914 to be added is selected via the selection menu 912, an "AddMonitor" button 916 in the web page 900 may be selected to cause the monitor manager 210 to add the selected monitor 914 to the selected monitor group 804. In some examples, the monitor manager 210 updates the selected monitor group 804 on selection of the "AddMonitor" button 916, while in other examples the monitor manager 210 adds the selected monitor 914 to the selection object 902, from where it may be removed via the "RemoveSelectedMonitor" button 908, and does not update the selected monitor group 804 unless and until the "SaveMonitorGroup" button 910 is selected.

The example web page 900 includes a "CreateMonitor" link or button 918. The example "CreateMonitor" link or button 918 may be similar or identical to the example "CreateMonitor" link or button 818 of FIG. 8. In some examples, the "CreateMonitor" link or button 918 of FIG. 9 causes any newly-created monitors to be automatically added to the selected monitor group 804 on creation. The example web page 900 includes a "ReturnToMonitorGroup" button 920 which, when selected, causes the monitor manager 210 to present the monitor groups 804, 806 associated with the selected monitor profile 304 (e.g., present the web page 800 of FIG. 8).

Figure 10:
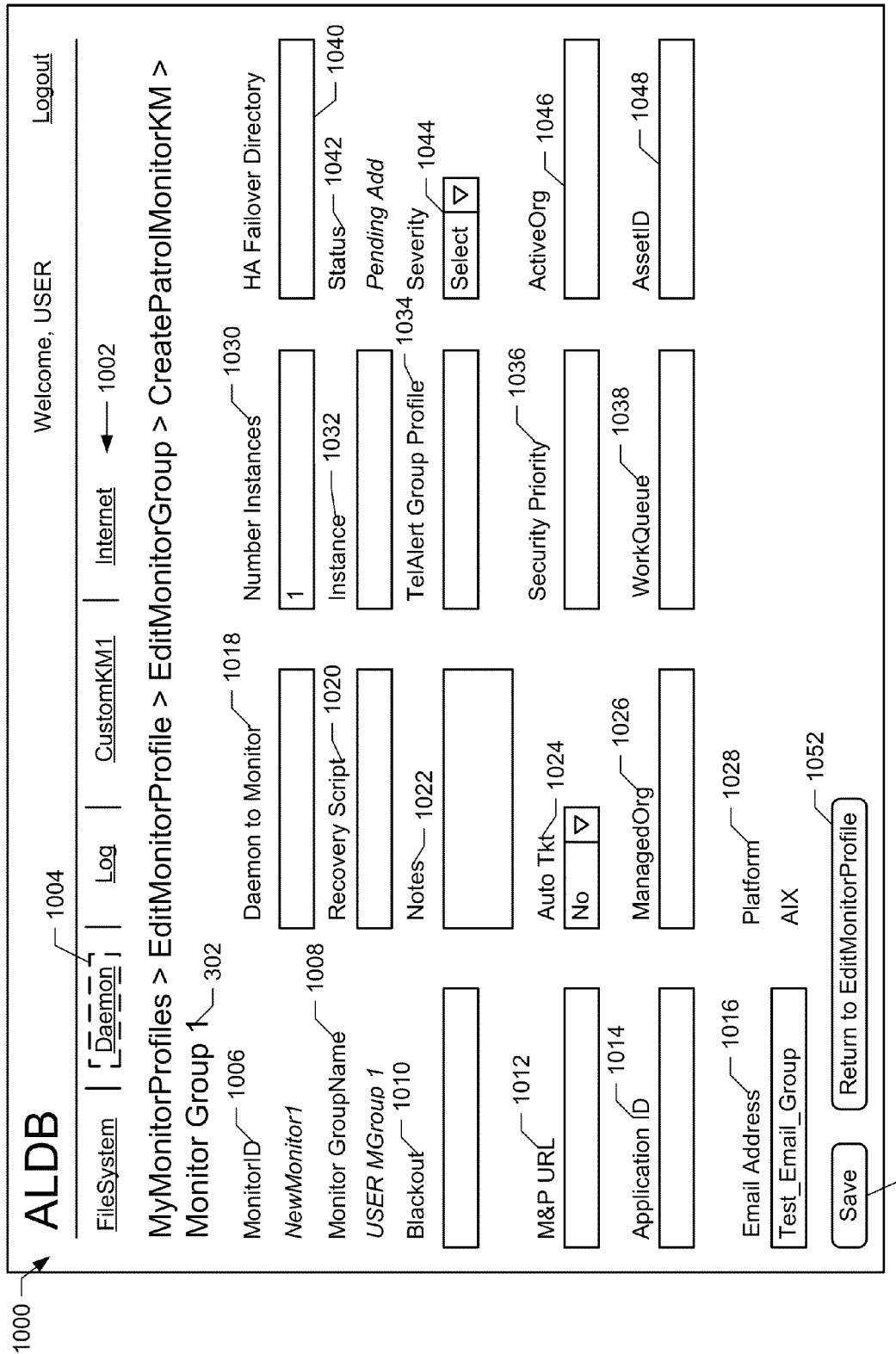
FIG. 10 illustrates an example web page presented in response to a request to create or edit a monitor.

FIG. 10 illustrates an example web page 1000 presented to a user in response to a request to create or edit a monitor. The example monitor manager 210 of FIG. 2 presents the example web page 1000 in response to a request to create a monitor (e.g., selection of a "CreateMonitor" link or button 818, 918 of FIGS. 8 and/or 9 via the user interface 202 of FIG. 2).

The example web page 1000 of FIG. 10 includes a listing of different knowledge modules 1002 that may be selected to create a new monitor. In the example of FIG. 10, a "Daemon" knowledge module 1004 is selected, and the monitor manager 210 presents monitor data fields 1006-1048 based on the selection. The example data fields 1006-1048 include a monitor ID 1006 (e.g., an identification number, a monitor name, etc.), a name of a classification or organizational group 1008 to which the monitor belongs (e.g., for organization and/or identification purposes, not to be confused with a monitor group), a blackout field 1010, a methods and procedures (M&P) uniform resource locator (URL) 1012, an application identifier 1014, an email address 1016, a daemon to be monitored 1018 (e.g., by the monitor), a recovery script 1020, notes about the monitor 1022, a selection of whether a ticket should automatically be generated 1024, a managed organization 1026, a platform on which the monitor is to be run 1028, a number of instances of the monitor to be run on each server to which the monitor is assigned 1030, an instance identifier 1032 (e.g., an instance name), a TelAlert group profile 1034, security priority 1036 (e.g., ESET priority), a work queue 1038, a high availability (HA) failover directory 1040, a status of the monitor 1042 in the alarm linkage database 114, a severity 1044 (e.g., severity of alarms resulting from the monitor), an active organization 1046, an asset identifier 1048, and/or any other type of parameter or information pertaining to the monitor to be created. In some examples, any or all of the data fields 1006-1048 may be pre-populated based on settings for the selected monitor profile 304.

A "Save" button 1050 causes the monitor manager 210 to update the alarm linkage database 114 using the data entered into the web page 1000. For example, the monitor manager 210 may request the alarm linkage database 114 to create a new monitor in association with the selected monitor profile 304, to include the new monitor in one or more monitor groups, and/or to re-apply monitor groups, which have been updated to include the new monitor, to server groups to which the monitor groups have been assigned. The example web page 1000 includes a "ReturnToEditMonitorProfile" button 1052 which, when selected, causes the profile manager 206 of FIG. 2 to present information associated with the selected monitor profile 304. The example "ReturnToEditMonitorProfile" button 1052 of FIG. 10 does not cause the monitor manager 210 to save any tentative changes made to the monitor via the web page 1000. In some examples, the "ReturnToEditMonitorProfile" button 1052 is replaced or supplemented by a "ReturnToEditMonitorGroup" button to cause the monitor manager 210 to present an interface to edit the selected monitor group 802.

Figure 11:
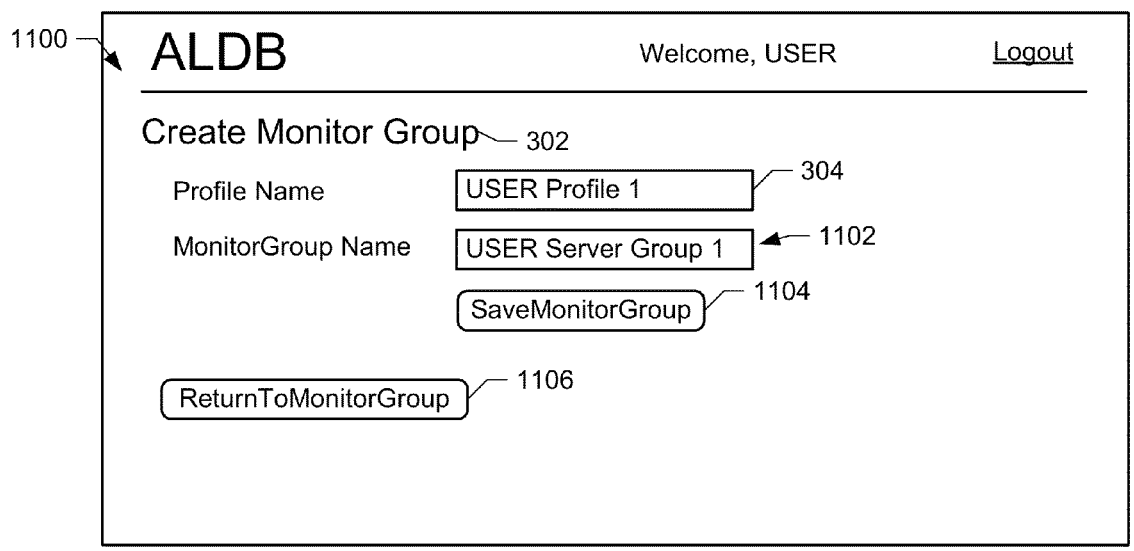
FIG. 11 illustrates an example web page presented in response to a request to create a monitor group.

FIG. 11 illustrates an example web page 1100 presented in response to a request to create a monitor group. The example monitor manager 210 of FIG. 2 may present the web page 1100 via the user interface 202 of FIG. 2 when the "CreateMonitorGroup" button 816 of FIG. 8 is selected. The example web page 1100 of FIG. 11 includes a monitor group name field 1102, into which a name of the monitor group to be created may be entered. In some examples, the monitor group name 1102 is pre-populated based on settings associated with the selected monitor profile 304.

The example web page 1100 includes a "SaveMonitorGroup" button 1104 to cause the monitor manager 210 to request that the monitor group be created in the alarm linkage database 114 with the requested monitor group name 1102. The example web page 1100 further includes a "ReturnToMonitorGroup" button 1106 which, when selected, causes the monitor manager 210 to present the monitor groups 804, 806 associated with the selected monitor profile 304 (e.g., present the web page 800 of FIG. 8). In some examples, selecting the "SaveMonitorGroup" button 1104 also causes the monitor manager 210 to present the monitor groups 804, 806 associated with the selected monitor profile 304 after submitting the request to create the monitor group.

Figure 12:
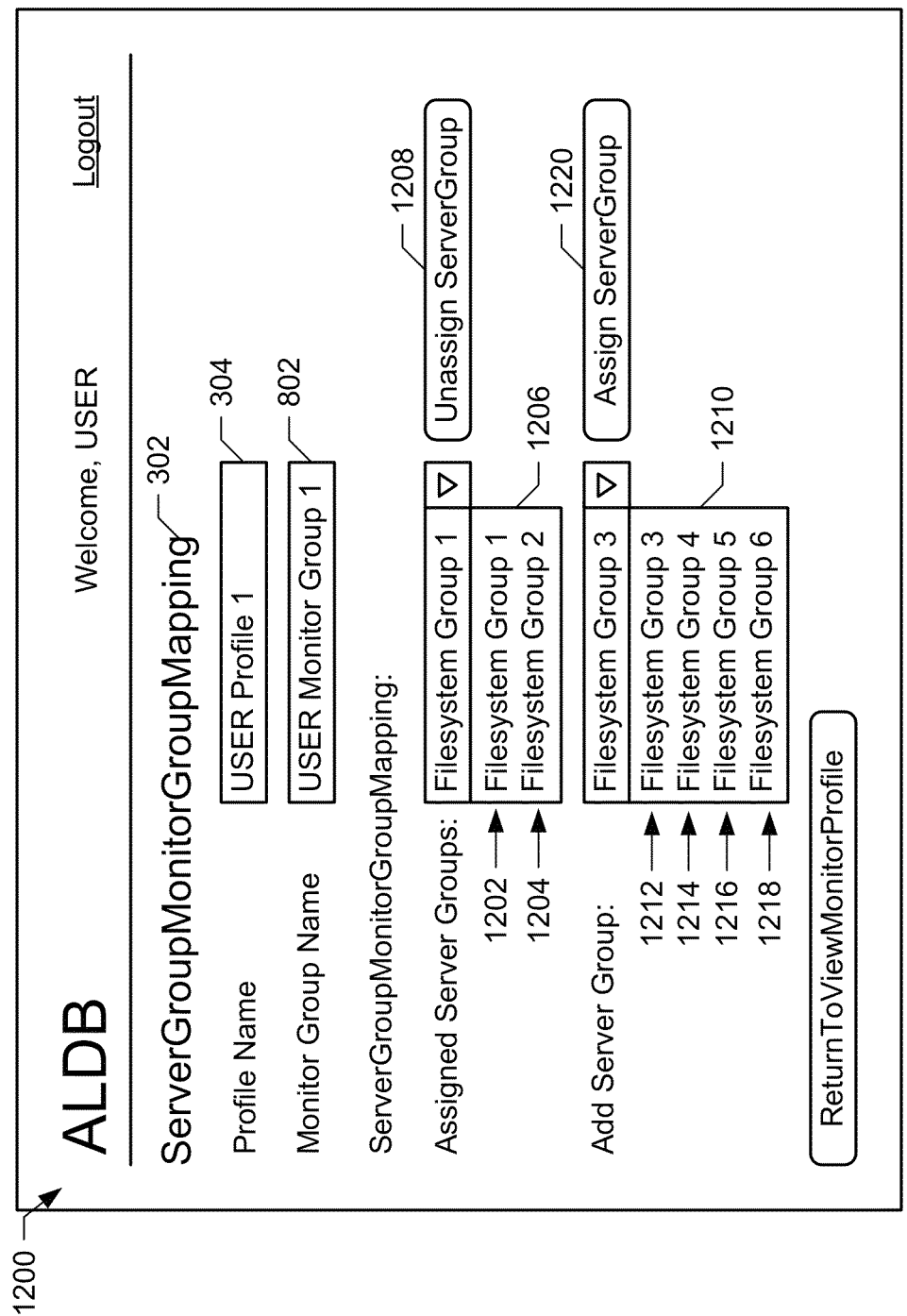
FIG. 12 illustrates an example web page presented in response to a request to apply a monitor group to a server group.

FIG. 12 illustrates an example web page 1200 presented to a user in response to a request to apply a monitor group to a server group. The example monitor manager 210 presents the example web page 1200 via the user interface 202 in response to a request to assign or map monitor groups to server groups (e.g., selection of the link 422 of FIG. 4). In the example of FIG. 12, the selected monitor group 802 is assigned to server groups 1202, 1204.

The example web page 1200 includes a selection menu 1206 to select server groups 1202, 1204 to which the monitor group 802 is to be unassigned. When an assigned server group 1202, 1204 is selected from the selection menu 1206, an "Unassign ServerGroup" button 1208 may be selected to cause the monitor manager 210 to request the selected monitor group 802 to be unassigned from the selected server group (e.g., to remove the monitors in the monitor group 802 from the servers in the selected server group).

The example web page 1200 further includes a selection menu 1210 listing server groups 1212, 1214, 1216, 1218 to which the selected monitor group 802 may be assigned. When an "Assign ServerGroup" button 1220 is selected, the example monitor manager 210 requests that the selected monitor group 802 be assigned to a selected server group (e.g., the server group 1212) in the selection menu 1210. The assignment request generated by the monitor manager 210 causes the monitors included in the selected monitor group 802 to be configured on the servers included in the selected server group 1212.

Using the example selection menus 1206, 1210, a change in alarm configurations can be rapidly initiated for a large number of servers (e.g., hundreds, thousands, tens of thousands, or more). The configuration of the monitors on the servers may be performed by, for example, the configuration implementer 124 of FIG. 1.

While an example interface to assign a monitor group to one or more server groups is illustrated in FIG. 12, other interfaces and/or arrangements may additionally or alternatively be used. For example, any type of selection object or menu may be used to select a server group and/or a monitor group. In some examples, a server group is selected and monitor groups may be selected for assigning and/or unassigning to the server group. In some other examples, one or more monitor groups are selected to be assigned to one or more server groups selected in the same interface. Furthermore, the example monitor manager 210 may request changes to the alarm configurations of servers by requesting changes to alarm configurations incrementally (e.g., requesting incremental changes to previous alarm configurations, such as assigning a monitor group to a server group while leaving prior alarm configuration information unchanged) and/or by overwriting previous alarm configurations (e.g., replacing complete prior alarm configurations of a server group with a complete updated alarm configuration).

To illustrate, a server group to which monitor group A and monitor group B (e.g., AB) are assigned is to have a monitor group C assigned. The example monitor manager 210 may incrementally update the server group by adding monitor group C in addition to monitor groups A and B. Alternatively, the example monitor manager 210 may overwrite the prior alarm configuration by removing the monitor groups A and B and assigning monitor group C to the server group.

Figure 13:
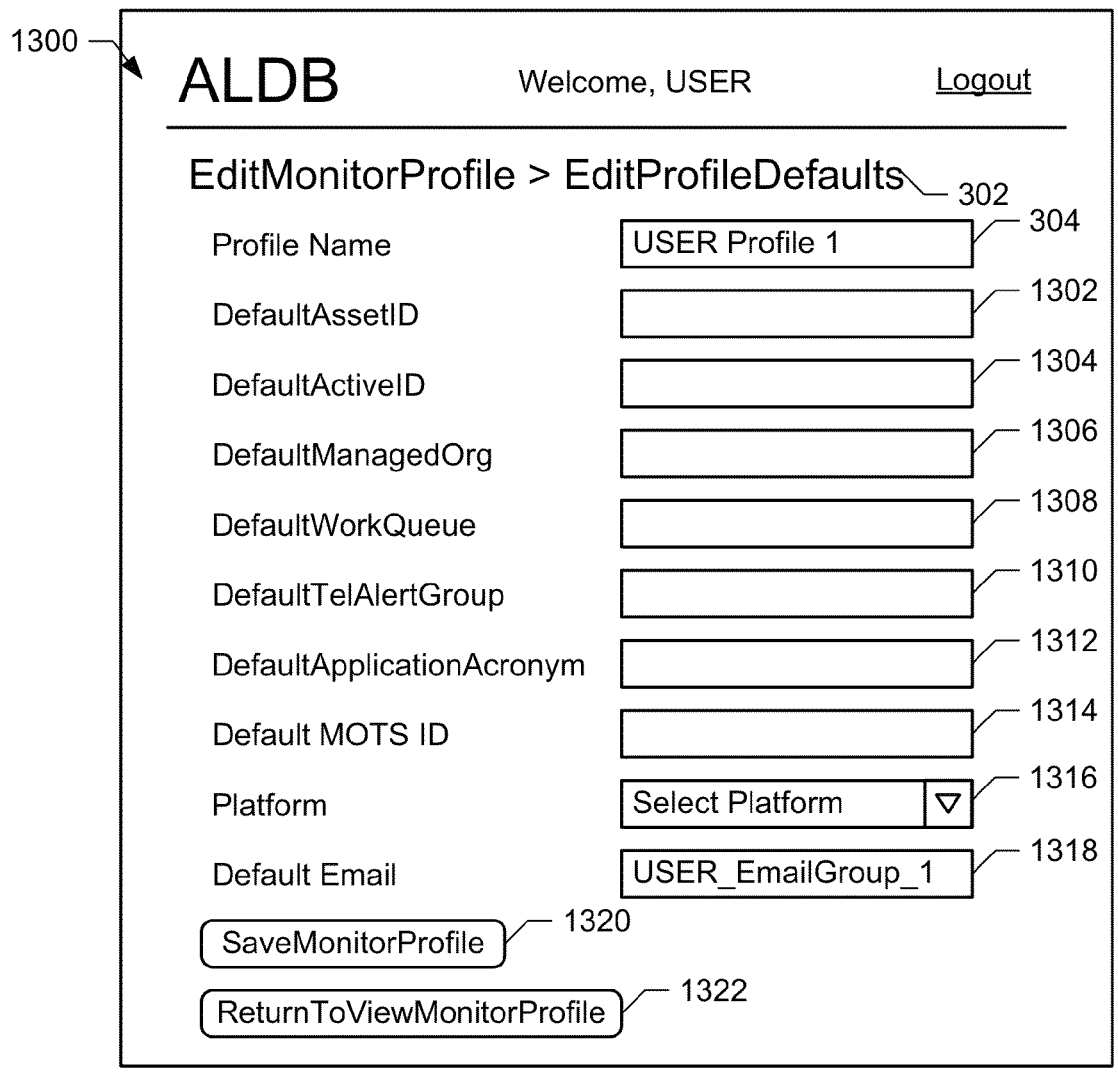
FIG. 13 illustrates an example web page presented in response to a request to edit a monitor profile.

FIG. 13 illustrates an example web page 1300 presented in response to a request to edit a monitor profile. The example web page 1300 may be presented by the profile manager 206 of FIG. 2 via the user interface 202 in response to a request to access and/or change a selected monitor profile. The example web page 1300 specifies the selected monitor profile 304 and provides fields and/or menu items 1302-1318. The fields and/or menu items 1302-1318 may be used to specify default properties for monitors, monitor groups, server groups, and/or assignments of monitor groups to server groups that are created in association with the selected monitor profile 304. In some examples, an authenticated user may organize monitor groups, server groups, monitors, and/or assignments of monitor groups to server groups, by monitor profiles according to the characteristics or properties that are to be defined as defaults for the monitor groups, server groups, monitors, and/or assignments. The example profile manager 206 therefore enables efficient creation of monitors, server groups, and monitor groups, and assignment of monitor groups to server groups.

When changes to any of the fields 1302-1318 have been entered, a "SaveMonitorProfile" button 1320 may be selected to cause the profile manager 206 to request that the changes to the selected monitor profile 304 be saved at the alarm linkage database 114. The web page 1300 also includes a "ReturnTo- ViewMonitorProfile" button 1322 which, when selected, causes the profile manager 206 to present information associated with the selected monitor profile 304 (e.g., present the web page 400 of FIG. 4) with or without saving changes to the fields 1302-1318 to the alarm linkage database.

The example report generator 212 of FIG. 2 accesses the alarm linkage database 114 to retrieve alarm configuration information and to generate reports of alarm configurations. The example report generator 212 compares an alarm configuration requested by a user for a server to an alarm configuration implemented on the server and generates a report of any discrepancies. This report may be provided to, for example, the user and/or to an administrator or manager of the server to address the discrepancies.

Figure 17:
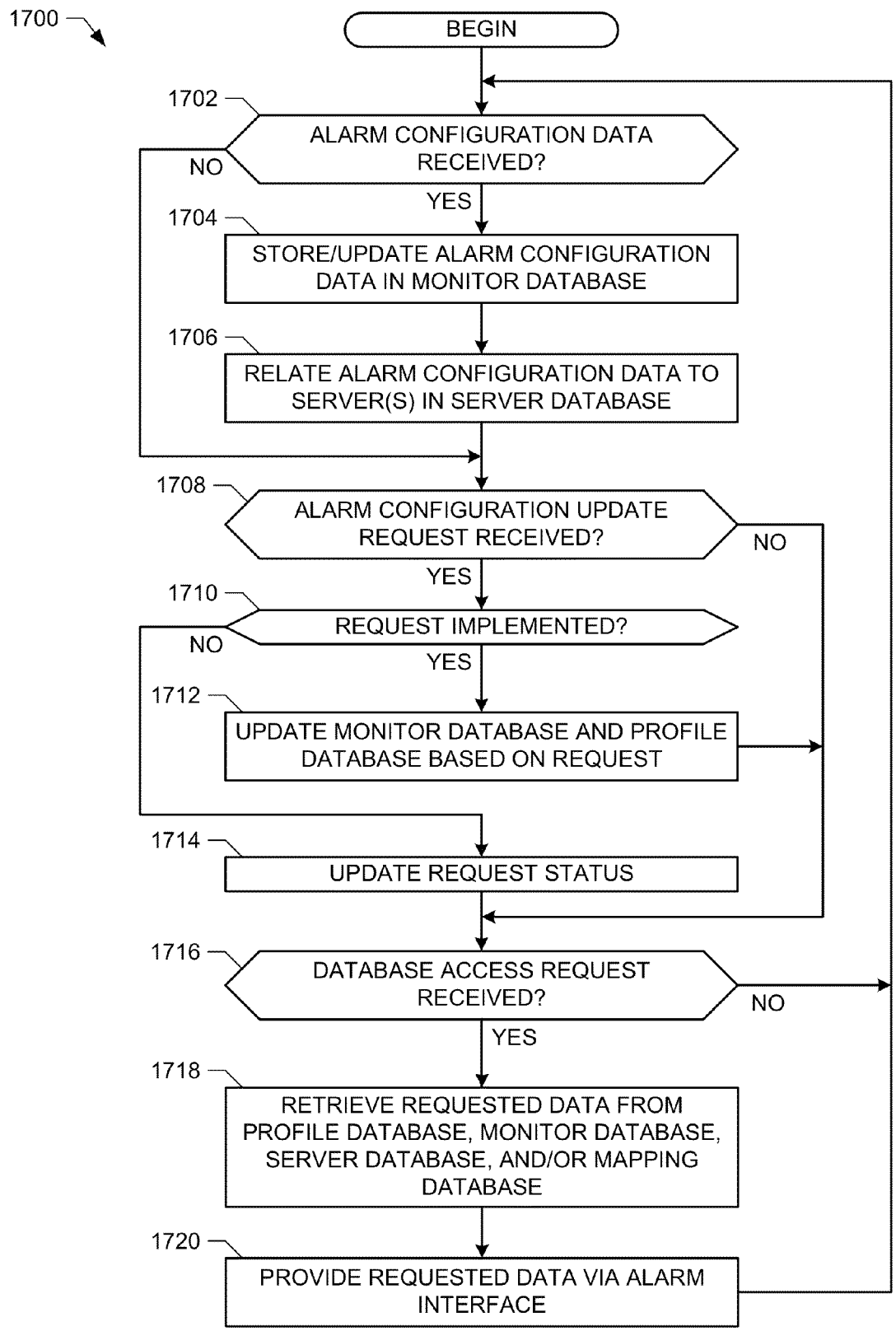
FIG. 17 is a flowchart representative of example machine readable instructions to store alarm information for a plurality of servers.
Figure 19:
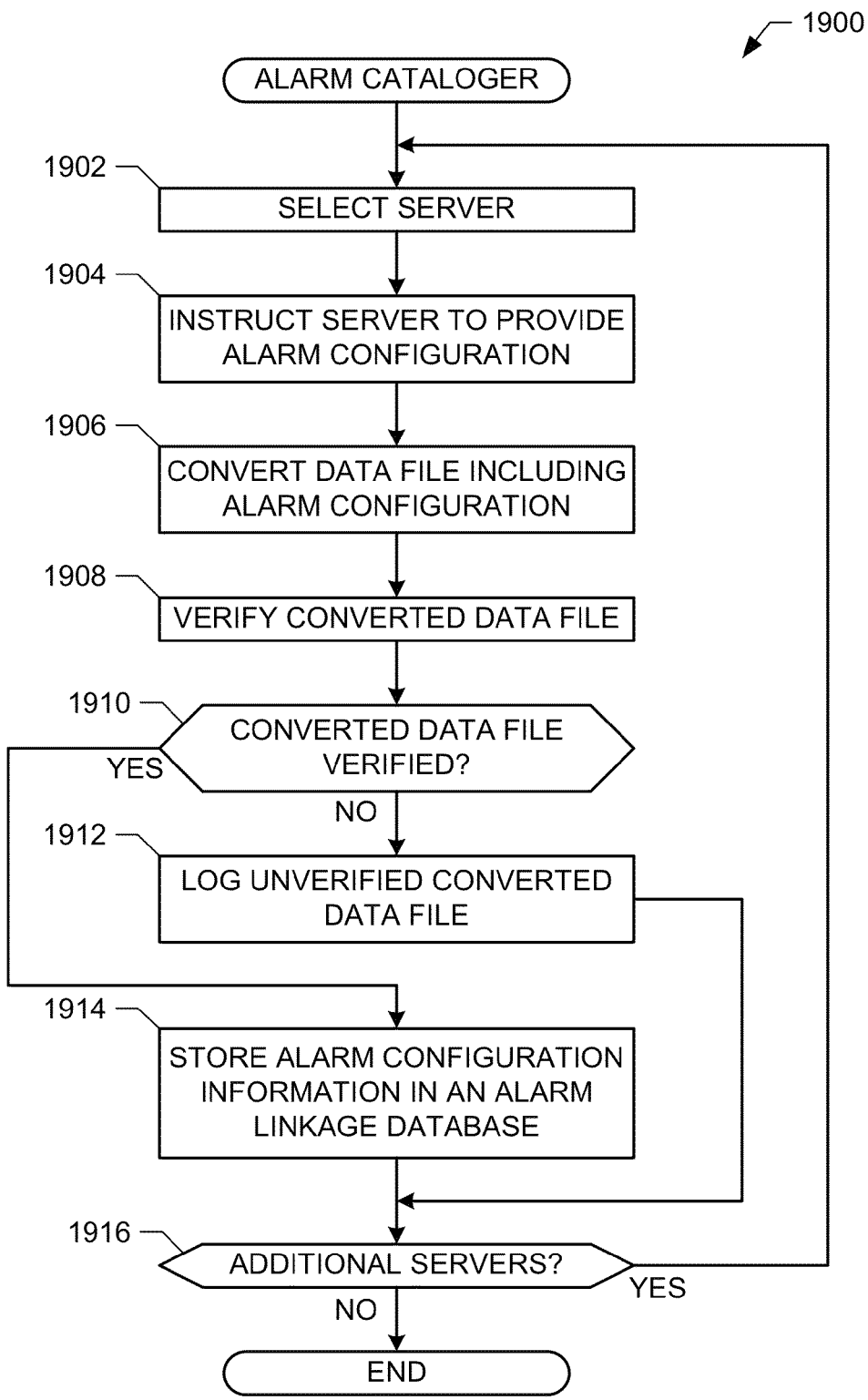
FIG. 19 is a flowchart representative of example machine readable instructions to collect and store alarm configuration information for a plurality of servers.

Flowcharts representative of example machine readable instructions for implementing the alarm interfaces 116, 200 of FIGS. 1 and/or 2 are shown in FIGS. 14A-14E. Flowcharts representative of example machine readable instructions for implementing the alarm linkage databases 114, 1500 of FIGS. 1 and/or 15 are shown in FIG. 17. Flowcharts representative of example machine readable instructions for implementing the alarm catalogers 124, 1800 of FIGS. 1 and/or 18 are shown in FIG. 19. In this example, the machine readable instructions comprise a program for execution by a processor such as the processor 2012 shown in the example computer 2000 discussed below in connection with FIG. 20. The program may be embodied in software stored on a tangible computer readable medium such as a CD-ROM, a floppy disk, a hard drive, a digital versatile disk (DVD), a Blu-ray disk, or a memory associated with the processor 2012, but the entire program and/or parts thereof could alternatively be executed by a device other than the processor 2012 and/or embodied in firmware or dedicated hardware. Further, although the example program is described with reference to the flowcharts illustrated in FIGS. 14A-14E, 17, and/or 19, many other methods of implementing the example alarm interfaces 116, 200 of FIGS. 1 and/or 2, the alarm linkage databases 114, 1500 of FIGS. 1 and/or 15, and/or the alarm catalogers 124, 1800 of FIGS. 1 and/or 18 may alternatively be used. For example, the order of execution of the blocks may be changed, and/or some of the blocks described may be changed, eliminated, or combined.

FIGS. 14A-14E collectively illustrate a flowchart representative of example machine readable instructions 1400 which may be executed to interface with an alarm linkage database (e.g., the alarm linkage database 114 of FIGS. 1 and/or 2). The example instructions 1400 of FIGS. 14A-14E may be implemented by the example alarm interfaces 116, 200 of FIGS. 1 and/or 2 to, for example, enable a user to efficiently access and/or change alarm configurations for servers in a network. The example instructions 1400 may advantageously be used to organize and modify alarm configurations for large numbers of servers (e.g., hundreds, thousands, tens of thousands, or more servers).

The example instructions 1400 may be performed when, for example, a user accesses the alarm interface 200 via a user device such as the user devices 118, 120 of FIG. 1. The example login manager 204 of FIG. 2 receives (e.g., via the user interface 202) user login information (block 1401). The login information may include, for example, an assigned user name, a password, a security token, and/or any other type of credentials and/or authentication information. If the user is not authenticated (block 1402), control returns to block 1401 to receive user login information.

If the user is authenticated (block 1402), the example profile manager 206 of FIG. 2 presents monitor profiles associated with the authenticated user (block 1403). For example, the profile manager 206 may request or retrieve the monitor profiles owned by and/or accessible by the authenticated user from the alarm linkage database 114 and present the monitor profiles in a web page via the user interface 202.

If a request to view a selected monitor profile is received (block 1404), control is transferred to block 1411 (FIG. 14B), described below. If a request to edit a selected monitor profile is received (block 1405), control is transferred to block 1418 (FIG. 14B), described below. If deletion of a selected monitor profile is received (block 1406), the example profile manager 206 deletes the selected monitor profile (block 1407). For example, the profile manager 206 may request the alarm linkage database 114 to delete the selected profile. After deleting a profile (block 1407), control returns to block 1403 to present the profiles associated with the user.

If viewing of a selected monitor profile, editing of a selected monitor profile, and deletion of a selected monitor are not selected (blocks 1404-1406), the profile manager 206 determines whether creation of a monitor profile has been requested (block 1408). If a request to create a monitor profile has been received (block 1408), the example profile manager 206 creates a new monitor profile (block 1409) and transfers control to block 1418 (FIG. 14B) with the newly created profile as the selected profile. If a request to create a monitor profile is not received (block 1408), the example login manager 204 determines whether the user has logged out (block 1410). If the user has not logged out (block 1410), control returns to block 1403 to continue to present the monitor profiles for the user. If the user has logged out (block 1410), control returns to block 1401 to receive new login information.

Figure 14A:
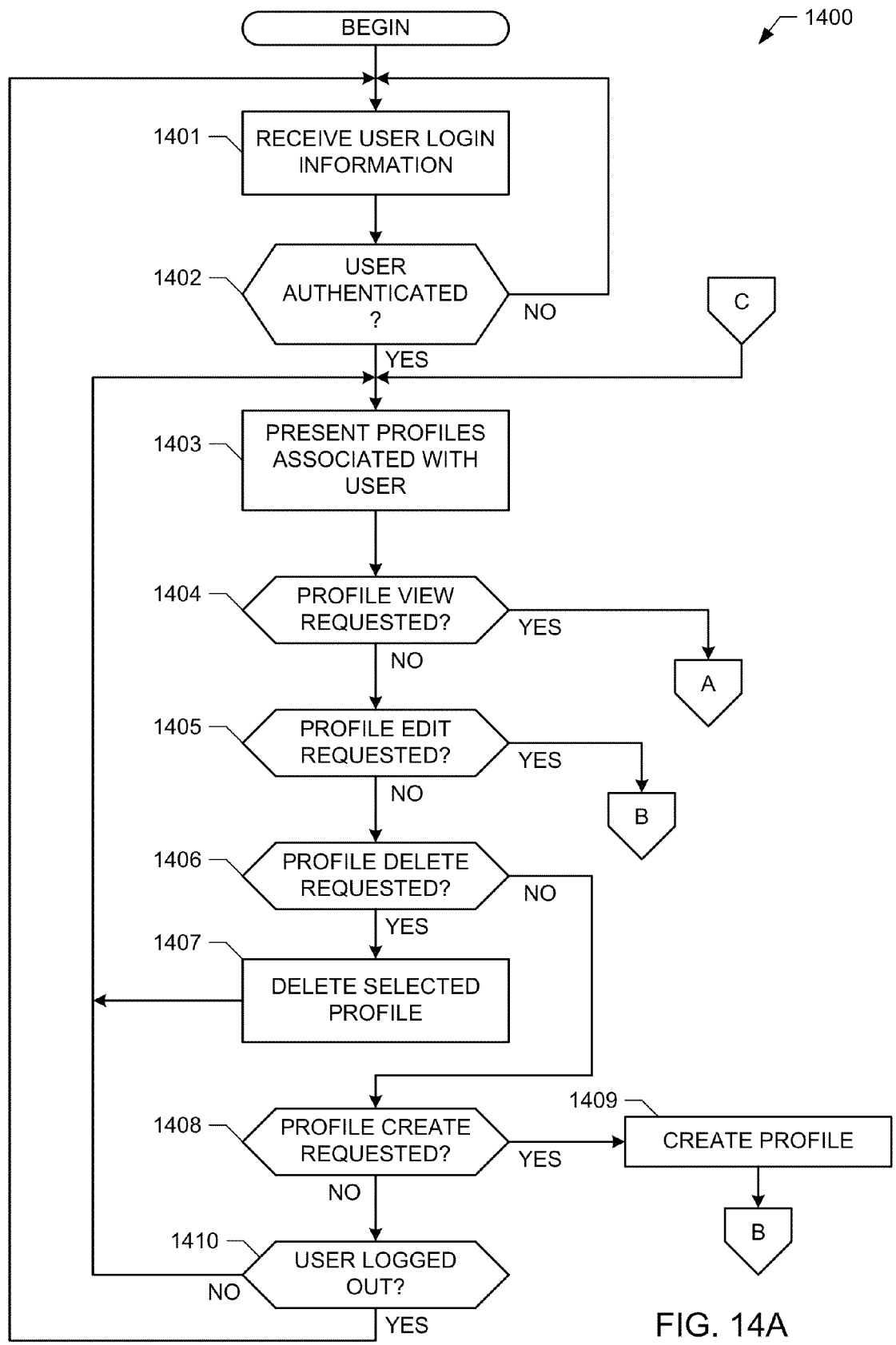
FIGS. 14A-14E collectively illustrate a flowchart representative of example machine readable instructions to interface with an alarm linkage database.
Figure 14B:
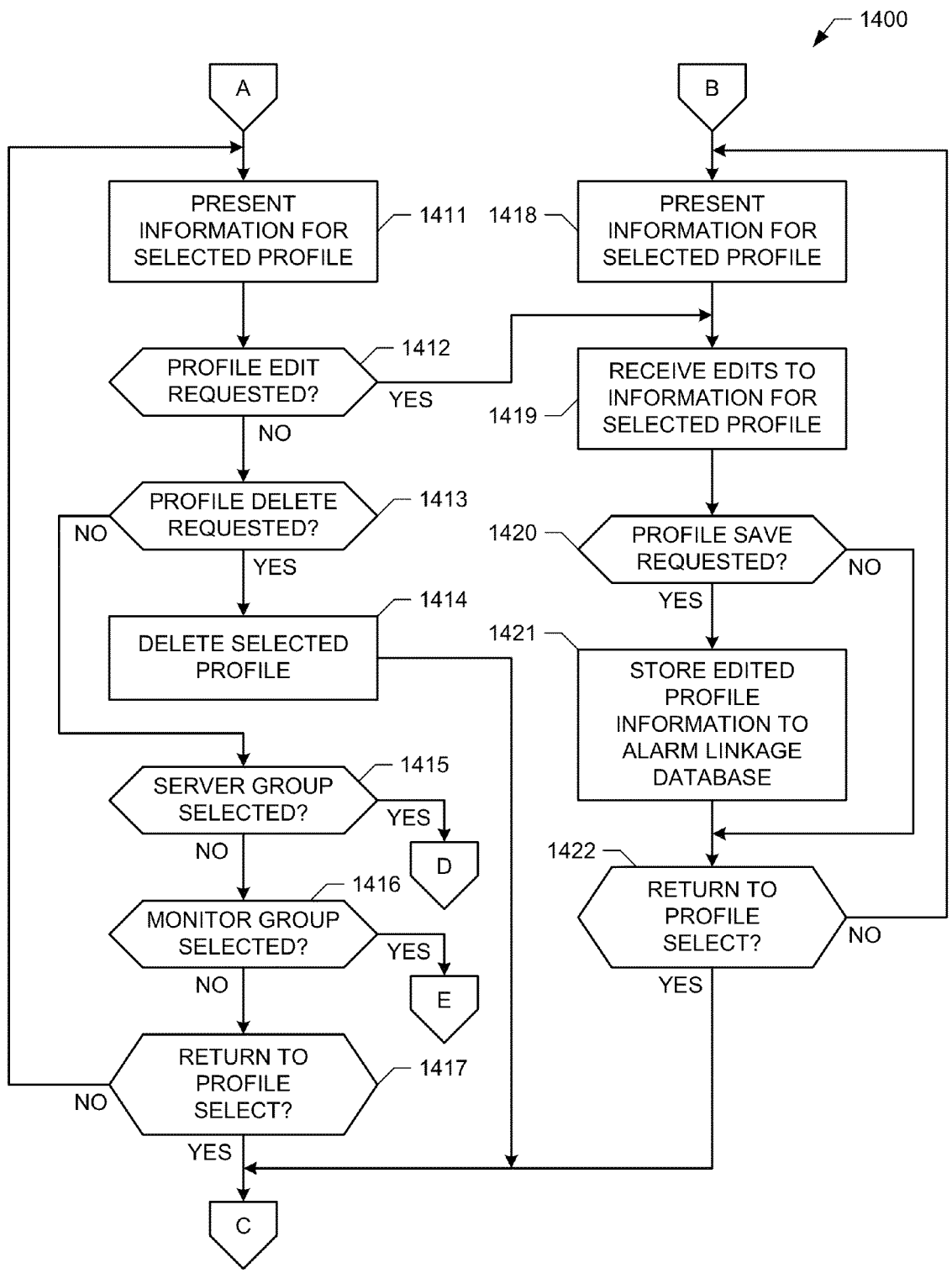

Turning to FIG. 14B, the example profile manager 206 presents information for a selected monitor profile (e.g., in response to a request to view a selected monitor profile) (block 1411). The example profile manager 206 determines whether a request to edit the selected monitor profile has been received (block 1412). If a request to edit the selected monitor profile has not been received (block 1412), the example profile manager 206 determines whether a request to delete the selected monitor profile has been received (block 1413). If deletion of the selected monitor profile has been requested (block 1413), the example profile manager 206 deletes the selected monitor profile (block 1414) and control returns to block 1403 (FIG. 14A) to present the monitor profiles.

Figure 14C:
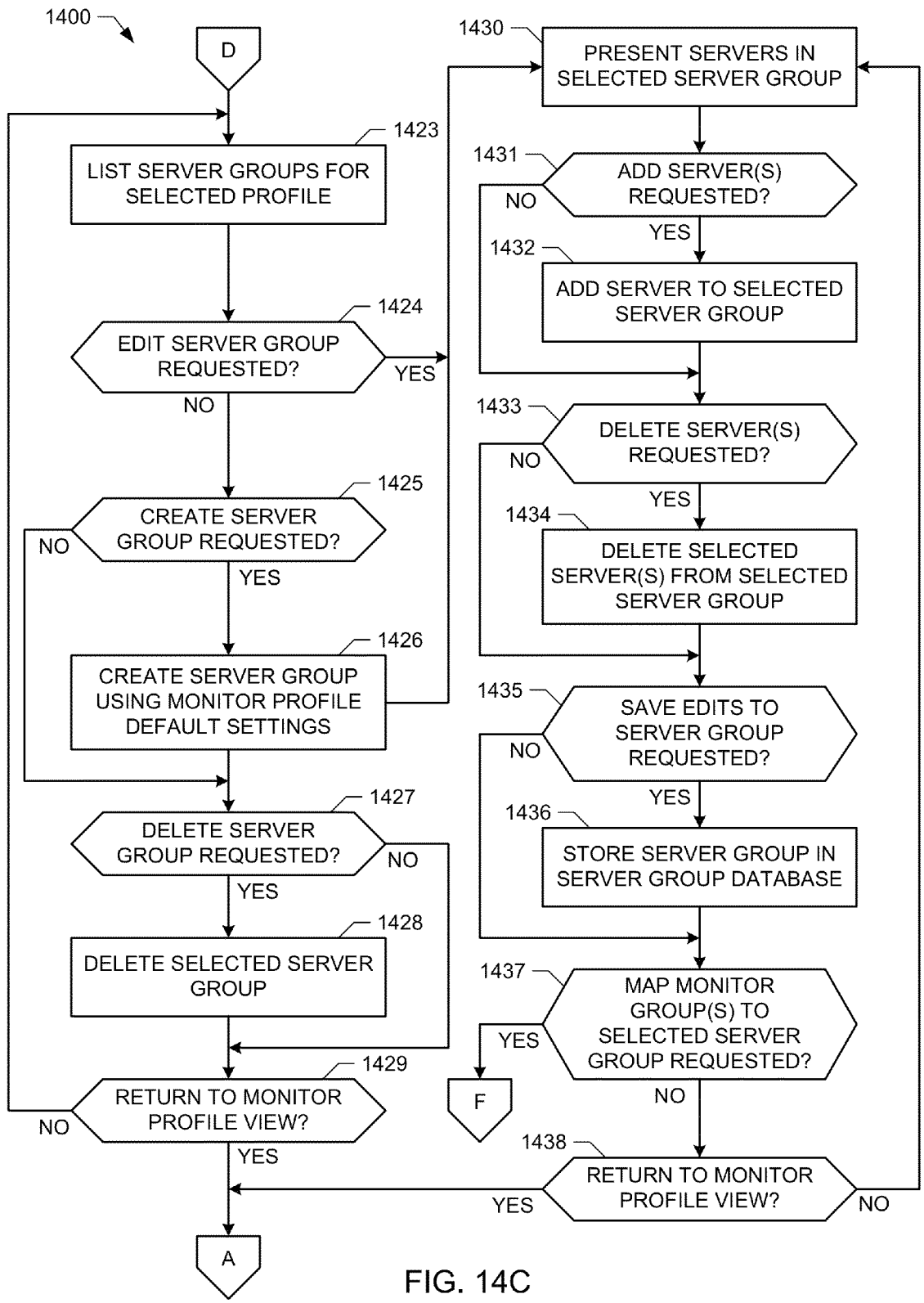
Figure 14D:
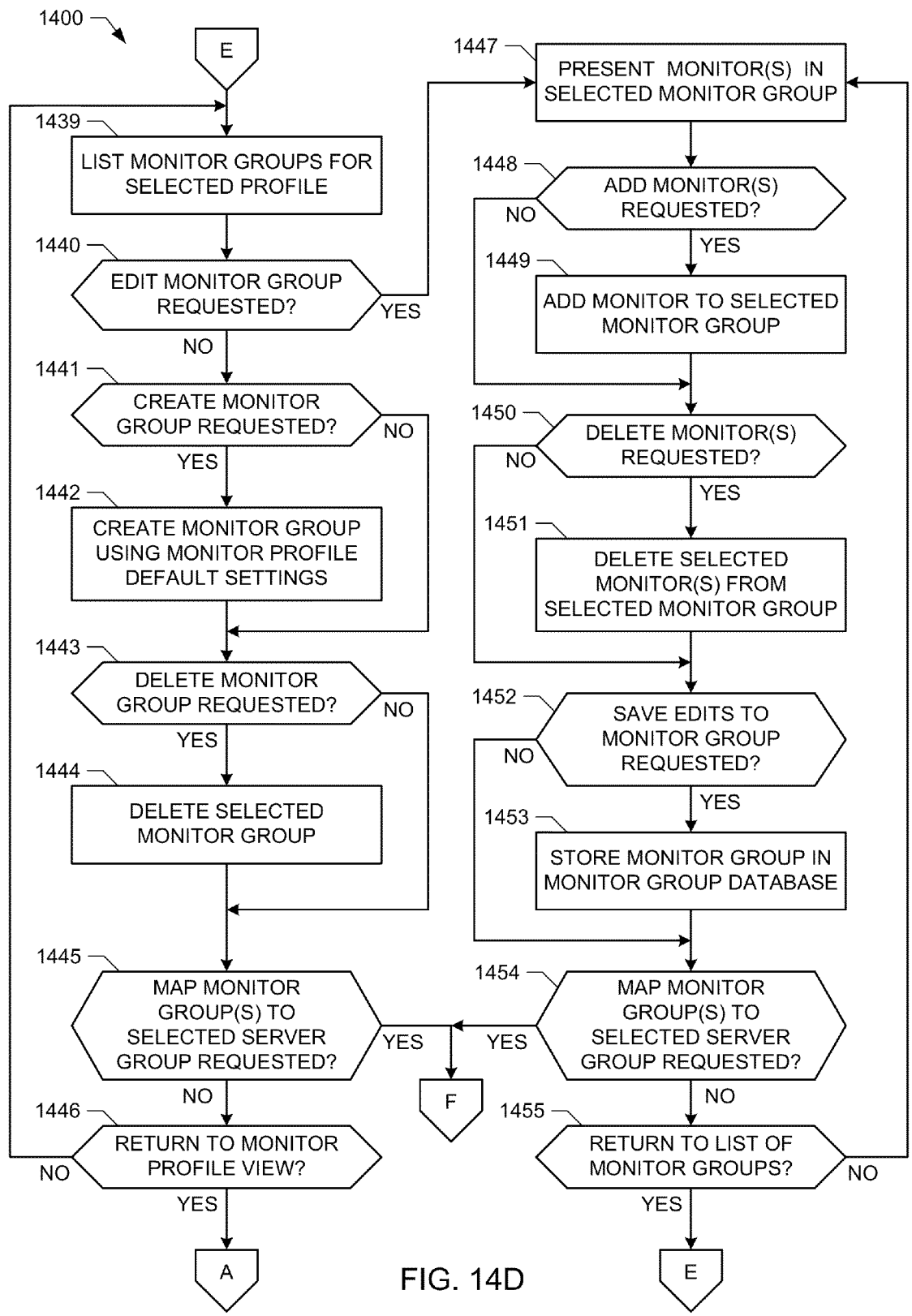

If a profile delete request has not been received (block 1413), the example profile manager 206 determines whether the monitor profile server groups have been selected (block 1415). For example, a request to view and/or edit the server groups associated with the selected monitor profile may be received via the user interface 202. If the server groups have been selected (block 1415), control is transferred to the server manager 208 at block 1423 (FIG. 14C). If the server groups have not been selected (block 1415), the example profile manager 206 determines whether the monitor profile monitor groups have been selected (block 1416). For example, a request to view and/or edit the monitor groups associated with the selected monitor profile may be received via the user interface 202. If the monitor groups have been selected (block 1416), control is transferred to the monitor manager 210 at block 1439 (FIG. 14D). The example profile manager 206 determines whether a request to return to selection of a monitor profile has been received (block 1417). If a request to return to a monitor profile selection has been received (block 1417), control returns to block 1403 (FIG. 14A). If a request to return to a monitor profile selection has not been received (block 1417), control returns to block 1411 to present information for the selected profile.

If a request to edit a selected monitor profile has been received in block 1405 (FIG. 14A), the example profile manager 206 presents information for the selected monitor profile (block 1418). After presenting the information (block 1418), or after an edit to the profile is requested in block 1412, the example profile manager 206 receives edits or modifications to the information for the selected profile (block 1419). For example, the profile manager 206 may receive, via the user interface 202, changes to profile defaults, a name of the monitor profile, and/or any other modifiable property or characteristic of the selected monitor profile. In the example instructions 1400, the edits are not saved until saving of the edits to the profile is requested (block 1420). If a request to save the monitor profile is received (block 1420), the example profile manager 206 stores the edited profile information in the alarm linkage database 114 (block 1421).

After storing the edited information (block 1421), or if saving of the profile is not requested (block 1420), the example profile manager 206 determines whether a return to the monitor profile selection has been requested (block 1422). If a request to return to a monitor profile selection has been received (block 1422), control returns to block 1403 (FIG. 14A). If a request to return to a monitor profile selection has not been received (block 1422), control returns to block 1418 to present the information for the selected profile. In the example instructions 1400, any unsaved changes to the selected monitor profile are ignored or discarded when control returns to block 1403.

Turning to FIG. 14C, the example server manager 208 of FIG. 2, in response to a selection of server groups associated with a selected monitor profile (block 1415 of FIG. 14B), lists server groups for the selected monitor profile (block 1423). For example, the server manager 208 may request the listing of server groups associated with the selected monitor profile from the alarm linkage database 114 of FIGS. 1 and/or 2. The example server manager 208 determines whether a request to edit a server group has been received (block 1424).

If a request to edit a server group has not been received (block 1424), the example server manager 208 determine whether a request to create a server group has been received (block 1425). If creation of a server group has been requested (block 1425), the example server manager 208 creates a new server group for the selected monitor profile using the default settings or properties associated with the selected monitor profile (block 1426). If a request to create a server group has not been received (block 1425), the example server manager 208 determines whether a request to delete a server group has been received (block 1427). If a request to delete a selected server group has been received (block 1427), the example server manager 208 deletes the selected server group (block 1428). For example, the server manager 208 may request that the alarm linkage database delete the server group.

The example server manager 208 determines whether control is to return to the profile manager 206 to view the monitor profile (block 1429). If viewing the monitor profile has not been requested (block 1429), control returns to block 1423 to list the server groups for the selected monitor profile. If viewing the monitor profile has been requested (block 1429), control returns to block 1411 (FIG. 14B) to present information for the selected profile.

After creating a server group (block 1426) or if a request to edit a server group has been received (block 1424), control is transferred to block 1430 to present the servers in the selected server group. For example, the server manager 208 may retrieve a listing of the servers included in the server group from the alarm linkage database 114. The server manager 208 determines whether a request to add server(s) to the server group has been received (block 1431). If a request to add server(s) has been received (block 1431), the example server manager 208 adds selected server(s) to the selected server group (block 1432). In the example instructions 1400, the server manager 208 tentatively adds the server(s) and does not generate a request to the alarm linkage database 114 to add the server(s) until a request to save changes to the server group is received.

After adding selected servers (block 1432) and/or if a request to add server(s) is not received (block 1431), the example server manager 208 determines whether a request to delete selected server(s) from the selected server group has been received (block 1433). If a request to delete server(s) has been received (block 1433), the example server manager 208 deletes the selected server(s) from the selected server group (block 1434). In the example instructions 1400, the server manager 208 tentatively delete the server(s) and does not generate a request to the alarm linkage database 114 to delete the server(s) from the selected server group until a request to save changes to the server group is received.

After deleting selected servers (block 1434) and/or if a request to delete server(s) is not received (block 1433), the example server manager 208 determines whether a request to save the selected server group has been received (block 1435). If a request to save the server group has been received (block 1435), the example server manager 208 stores the server group in a server group database (e.g., provides the updates and a request to save the server group to the alarm linkage database 114) (block 1436).

Figure 14E:
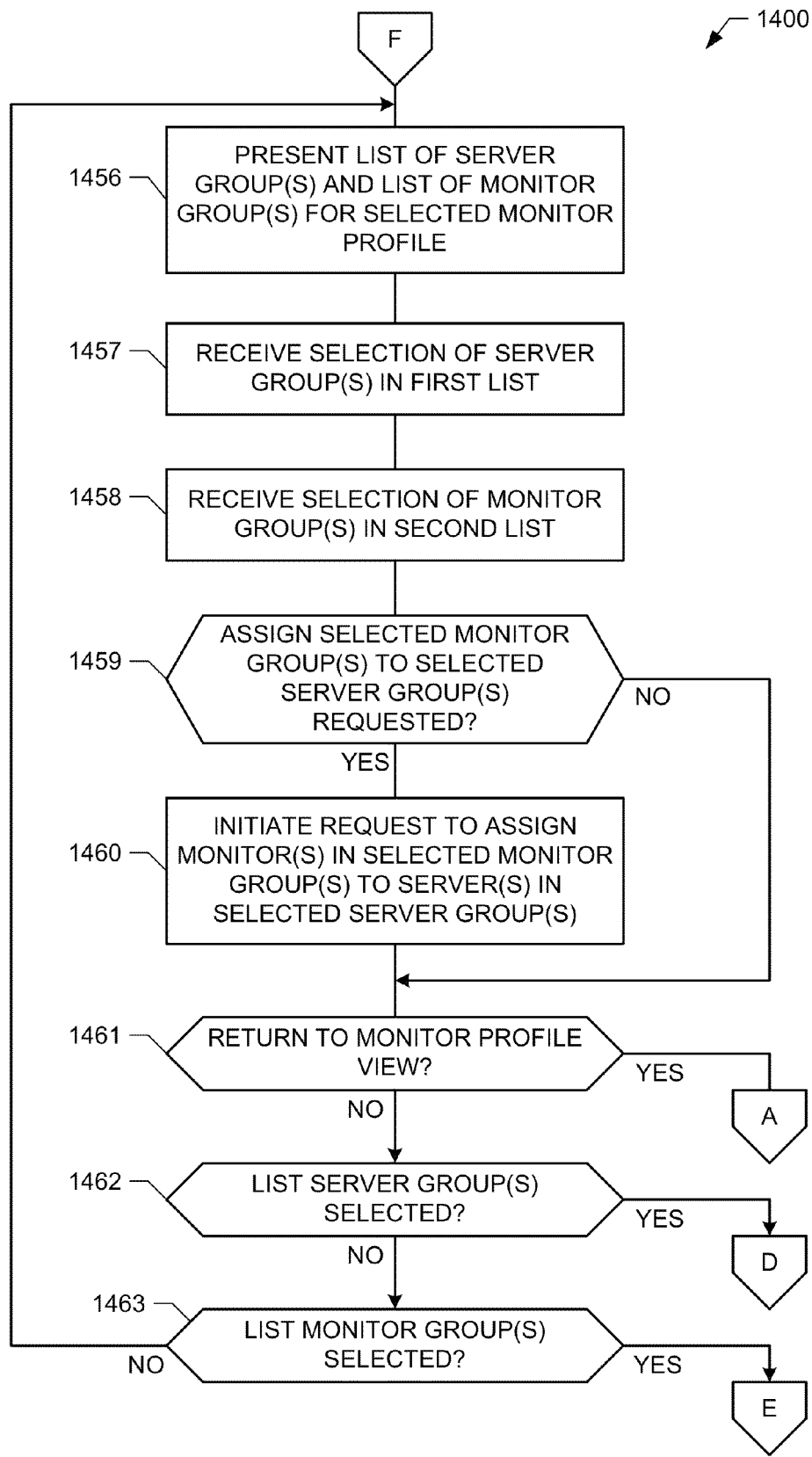

After saving the server group (block 1436) or if saving the server group has not been requested (block 1435), the example server manager 208 determines whether a request to map monitor group(s) to server group(s) has been received (block 1437). If a request to map has been received (block 1437), control is transferred to the example monitor manager 210 of FIG. 2 at block 1456 (FIG. 14E). If a request to map has not been received (block 1437), the example server manager 208 determines whether to return to presenting monitor profile information (block 1438). If the server manager 208 is to return to presenting monitor profile information (block 1438), control returns to the profile manager 206 at block 1411 (FIG. 14B). If the server manager 208 is to not return to presenting monitor profile information (block 1438), control returns to block 1430 to present the servers in the selected server group.

Turning to FIG. 14D, in response to a selection or request to view monitor groups (block 1416 of FIG. 14 B), the example monitor manager 210 of FIG. 2 lists monitor groups for the selected monitor profile (block 1439). For example, the monitor manager 210 may request the listing of monitor groups associated with the selected monitor profile from the alarm linkage database 114 of FIGS. 1 and/or 2. The example monitor manager 210 determines whether a request to edit a monitor group has been received (block 1440).

If a request to edit a monitor group has not been received (block 1440), the example monitor manager 210 determines whether a request to create a monitor group has been received (block 1441). If creation of a monitor group has been requested (block 1441), the example monitor manager 210 creates a new monitor group for the selected monitor profile using the default settings or properties associated with the selected monitor profile (block 1442). If a request to create a monitor group has not been received (block 1441), the example monitor manager 210 determines whether a request to delete a monitor group has been received (block 1443). If a request to delete a selected monitor group has been received (block 1443), the example monitor manager 210 deletes the selected monitor group (block 1444). For example, the monitor manager 210 may request that the alarm linkage database 114 delete the selected monitor group.

After deleting the selected monitor group (block 1444) or if deleting a monitor group has not been requested (block 1443), the example monitor manager 210 determines whether a request to map monitor group(s) to monitor group(s) has been received (block 1445). If a request to map has been received (block 1445), control is transferred to the example monitor manager 210 of FIG. 2 at block 1456 (FIG. 14E). If a request to map has not been received (block 1445), the example monitor manager 210 determines whether to return to presenting monitor profile information (block 1446). If the monitor manager 210 is to return to presenting monitor profile information (block 1446), control returns to the profile manager 206 at block 1411 (FIG. 14B). If the monitor manager 210 is to not return to presenting monitor profile information (block 1446), control returns to block 1439 to present the monitor groups for the selected profile.

If a request to edit a monitor group has been received (block 1440), control is transferred to block 1447 to present the monitors in the selected monitor group. For example, the monitor manager 210 may retrieve a listing of the monitors included in the selected monitor group from the alarm linkage database 114. The monitor manager 210 determines whether a request to add monitor(s) to the monitor group has been received (block 1448). If a request to add monitor(s) has been received (block 1448), the example monitor manager 210 adds selected monitor(s) to the selected monitor group (block 1449). In the example instructions 1400, the monitor manager 210 tentatively adds the monitor(s) and does not generate a request to the alarm linkage database 114 to add the monitor(s) until a request to save changes to the monitor group is received.

After adding selected monitors (block 1449) and/or if a request to add monitor(s) is not received (block 1448), the example monitor manager 210 determines whether a request to delete selected monitor(s) from the selected monitor group has been received (block 1450). If a request to delete monitor(s) has been received (block 1450), the example monitor manager 210 deletes the selected monitor(s) from the selected monitor group (block 1451). In the example instructions 1400, the monitor manager 210 tentatively deletes the monitor(s) and does not generate a request to the alarm linkage database 114 to delete the monitor(s) from the selected monitor group until a request to save changes to the monitor group is received.

After deleting selected monitors (block 1451) and/or if a request to delete monitor(s) is not received (block 1450), the example monitor manager 210 determines whether a request to save edits to the selected monitor group has been received (block 1452). If a request to save the monitor group has been received (block 1452), the example monitor manager 210 stores the monitor group in a monitor group database (e.g., provides the updates and a request to save the monitor group to the alarm linkage database 114) (block 1453).

After saving the monitor group (block 1453) or if saving the monitor group has not been requested (block 1452), the example monitor manager 210 determines whether a request to map monitor group(s) to monitor group(s) has been received (block 1454). If a request to map has been received (block 1454), control is transferred to block 1456 (FIG. 14E). If a request to map has not been received (block 1437), the example monitor manager 210 determines whether to return to presenting a list of monitor groups (block 1455). If the monitor manager 210 is to return to presenting a list of monitor groups (block 1455), control returns to block 1439. If the monitor manager 210 is to not return to presenting monitor profile information (block 1455), control returns to block 1447 to present the monitors in the selected monitor group.

Turning to FIG. 14E, the example monitor manager 210 presents a list of server group(s) and a list of monitor group(s) for the selected monitor profile (e.g., via the user interface 202) (block 1456). For example, the monitor manager 210 may retrieve a list of server groups and a list of monitor groups associated with the selected monitor profile from the alarm linkage database 114. The example monitor manager 210 receives a selection of server group(s) in the first list (block 1457). The example monitor manager 210 receives a selection of monitor group(s) in the second list (block 1458).

The monitor manager 210 determines if a request to assign the selected monitor group(s) (block 1458) to the selected server group(s) (block 1459) has been received (block 1459). For example, the request may be received via the user interface 202. If a request to assign has been received (block 1459), the example monitor manager 210 initiates a request to assign the monitors in the selected monitor group(s) to the servers in the selected server group(s) (block 1460). For example, the monitor manager 210 may generate a request to the alarm linkage database 114 and/or to the configuration implementer 124 of FIG. 1.

After initiating the request to assign monitor group(s) to server group(s) (block 1460), or if assignment has not been requested (block 1459), the example monitor manager 210 determines whether to return to presenting the selected monitor profile (block 1461). If the monitor manager is to return to presenting the monitor profile (block 1461), control returns to block 1411 (FIG. 14B).

If the monitor manager 210 determines not to return to presenting the selected monitor profile (block 1461), the example monitor manager 210 determines whether listing the server group(s) has been selected (block 1462). If listing the server group(s) has been selected (block 1462), control returns to block 1423 (FIG. 14C).

If the monitor manager 210 determines not to return to listing the server group(s) (block 1462), the example monitor manager 210 determines whether listing the monitor group(s) has been selected (block 1463). If listing the monitor group(s) has been selected (block 1463), control returns to block 1439 (FIG. 14D). If the monitor manager 210 determines not to return to listing the server group(s) (block 1463), control returns to block 1456.

Figure 15:
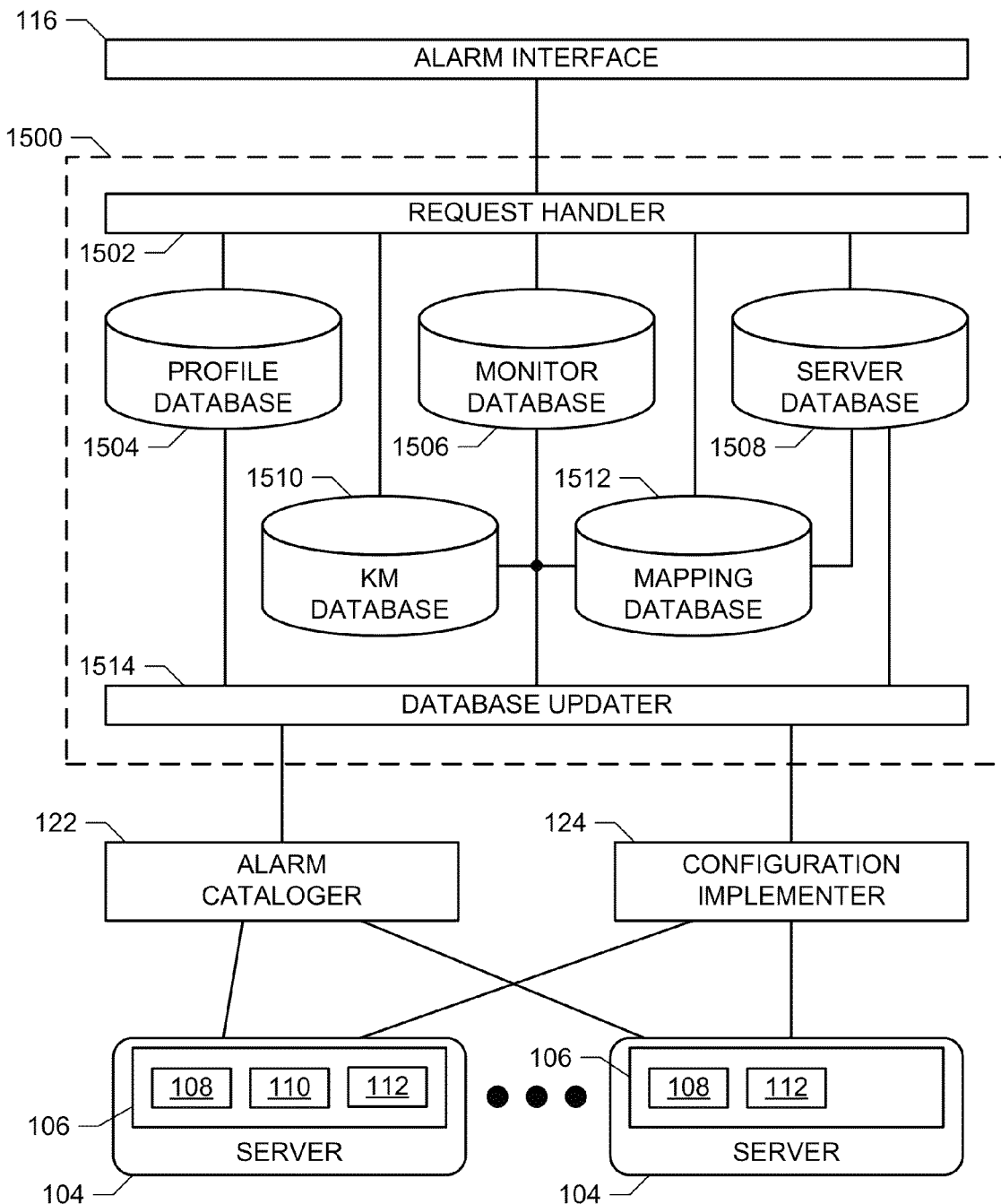
FIG. 15 is a block diagram of an example alarm linkage database.

FIG. 15 is a block diagram of an example alarm linkage database 1500. The example alarm linkage database 1500 of FIG. 15 may implement the alarm linkage database 114 of FIGS. 1 and/or 2 to store alarm information and/or to provide alarm configuration information to a user (e.g., via the alarm interfaces 116, 200 of FIGS. 1 and/or 2). As described in more detail below, the example alarm linkage database 1500 of FIG. 15 enables efficient management of alarms for large numbers of servers in a network.

The example alarm linkage database 1500 of FIG. 1 includes a request handler 1502, a profile database 1504, a monitor database 1506, a server database 1508, a knowledge module database 1510, a mapping database 1512, and a database updater 1514. In some examples, the profile database 1504, the monitor database 1506, the server database 1508, the knowledge module database 1510, and the mapping database 1512 are implemented using database tables (e.g., relational database tables, SQL tables, etc.). The example database updater 1514 of FIG. 15 interfaces with the alarm cataloger 122 and the configuration implementer 124 of FIG. 1 to update the example profile database 1504, the example monitor database 1506, the example server database 1508, the example knowledge module database 1510, and/or the example mapping database 1512 in responses to changes to alarm configurations of servers in a network (e.g., the servers 104 of the network 102 of FIG. 1.

The example request handler 1502 of FIG. 15 receives requests from the alarm interface 116. Example requests may include requests to view, edit, create, and/or delete monitor profiles; view, edit, create, and/or delete monitor groups and/or server groups; and/or assign monitor groups to server groups.

The example profile database 1504 of FIG. 15 stores monitor profiles including characteristics and properties of profiles. Example characteristics of monitor profiles include the names of the monitor profiles, users who have privileges to view and/or edit a monitor profile, and/or default settings of a monitor profile. In response to a request involving a monitor profile, the example request handler 1502 accesses the profile database 1504 to retrieve the appropriate monitor profile information to respond to the request.

The example monitor database 1506 of FIG. 15 stores monitors and/or monitor groups. For example, storing a monitor group may include storing identifications of monitors included in the monitor group. In the example of FIG. 15, information stored in association with a monitor is based on the knowledge module associated with the monitor (e.g., one or more pieces of stored information are specific to the knowledge module).

The example server database 1508 of FIG. 15 stores information about the servers 104 in the network 102 and server groups. For example, the server database 1508 may store the servers that are included in respective server groups.

The example knowledge module database 1510 of FIG. 15 stores information regarding knowledge modules used to monitor the servers in the network. For example, the knowledge module database 1510 may include the parameters used by particular knowledge modules. These parameters are accessed, for example, to determine information to be included in the monitor database 1506 in association with monitors based on the corresponding knowledge modules.

The example mapping database 1512 of FIG. 15 stores information regarding mapping of monitors and/or monitor groups to servers and/or server groups. The example mapping database 1512 may organize the mappings, for example, by identifiers of monitor groups in association with identifiers of the server groups to which they are assigned. Additionally or alternatively, the example mapping database 1512 may organize the mappings using the identifiers of the server groups with the monitor groups assigned to the server groups.

Figure 16:
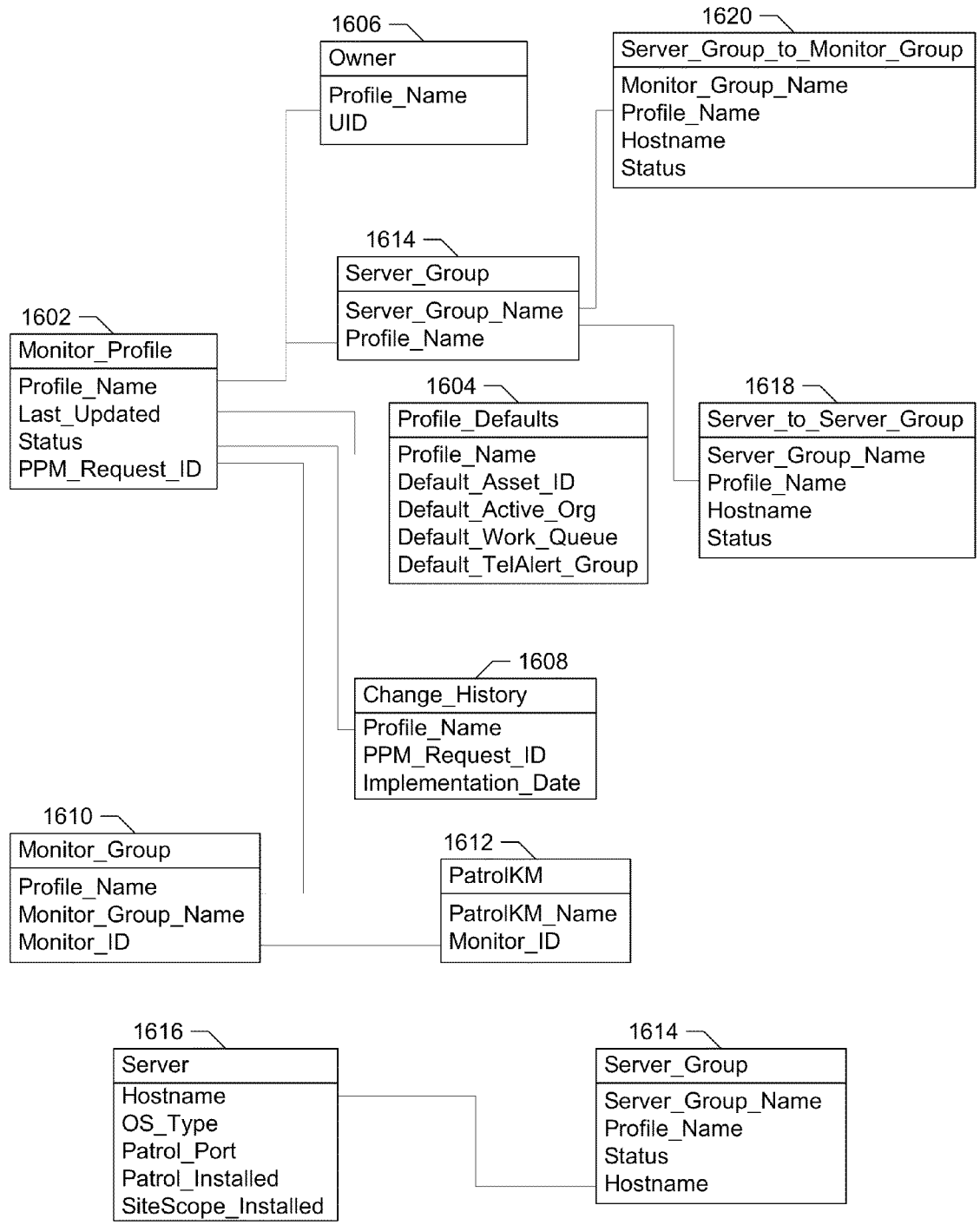
FIG. 16 illustrates example data structures stored in the alarm linkage database of FIG. 15.

FIG. 16 illustrates example data structures 1602-1624 stored in the alarm linkage database 1500 of FIG. 15. The example data structures 1602-1624 are stored in the example databases 1504-1512 and may be accessed to present alarm configuration information and/or modified when alarm configurations are changed.

A Monitor_Profile structure 1602 includes data associated with stored monitor profiles. The example Monitor_Profile structure 1602 of FIG. 16 is related to a Profile_Defaults structure 1604 that may be accessed to obtain defaults for a particular monitor profile. The example Monitor_Profile structure 1602 is also related to an Owner structure 1606 that stores an owner of the monitor profiles and to a Change_History structure 1608 that stores changes to stored profile managers and the statuses of submitted changes. The example Monitor_Profile structure 1602, the example Profile_Defaults structure 1604, the example Owner structure 1606, and the example Change_History structure 1608 of FIG. 16 are stored in the example profile database 1504 of FIG. 15.

A Monitor_Group structure 1610 stores information about monitor groups. The example Monitor_Group structure 1610 of FIG. 16 is linked to the Monitor_Profile structure 1602 to identify the monitor profile with which a stored monitor group is associated. The example Monitor_Group structure 1610 stores a name of each monitor group and identifiers of monitors included in the monitor groups. The Monitor_Group structure 1610 may be stored in the example monitor database 1506 of FIG. 15.

A PatrolKM structure 1612 stores mappings of knowledge modules (e.g., knowledge modules for Patrol agents to perform alarm monitoring) to monitors. The example PatrolKM structure 1612 of FIG. 16 is stored in the example KM database 1510 of FIG. 15 and may be accessed to determine an alarm configuration associated with an identified monitor.

A Server_Group structure 1614 stores information about server groups including, for example, a name of the server group and a monitor profile associated with the server group. Accordingly, the example Server_Group structure 1614 of FIG. 16 is linked to the Monitor_Profile structure 1602. The example Server_Group structure 1614 is linked to a Server structure 1616, a Server_to_Server_Group structure 1618, and a Server_Group_to_Monitor_Group structure 1620. The example Server_Group structure 1614, the example Server structure 1616, and the example Server_to_Server_Group structure 1618 of FIG. 16 are stored in the example server database 1508 of FIG. 15. The example Server_Group_to_Monitor_Group structure 1620 is stored in the example monitor database 1506.

The example Server structure 1616 of FIG. 16 includes information associated with the servers 104 in the network 102 of FIG. 1. Accordingly, the example Server structure 1616 may include a large number of entries corresponding to a large-scale network 102 (e.g., hundreds, thousands, or tens of thousands of the servers 104). The Server structure 1616 stores information such as the host names (e.g., identifiers, server names) of the servers 104, an operating system type, information regarding a monitoring agent (e.g., Patrol) and whether one or more types of monitoring agents are installed. The example Server_Group structure 1614 stores host names of the servers 104 that are included in each stored server group, which links the Server_Group structure 1614 to the Server structure 1616.

The example Server_to_Server_Group structure 1618 of FIG. 16 also stores the associations of the example servers 104 and the server groups. In the example of FIG. 16, the Server_to_Server_Group structure 1618 may be organized (e.g., keyed) according to the host name of the server (e.g., list the server groups to which each server 104 belongs, organized by host name) and/or according to the name of the server group (e.g., list the servers 104 belonging to each server group, organized by server group name).

The example Server_Group_to_Monitor_Group structure 1620 of FIG. 16 stores the associations of the example servers and monitor groups. The example Server_Group_to_Monitor_Group structure 1620 of FIG. 16 includes the name of a monitor group and the host names of servers 104 to which monitors in the monitor group are assigned. In other words, entries exist for each of the example monitor groups and include information about the servers to which the monitor groups are assigned. In some examples, the Server_Group_to_Monitor_Group structure 1620 may be organized (e.g., keyed) according to the host name of the server (e.g., list the monitor groups assigned to each server 104, organized by host name) according to the name of a server group (e.g., list the monitor groups assigned to each server group, organized by server group name), and/or according to the name of a monitor group (e.g., list the servers or server groups to which each monitor group is assigned, organized by monitor group name). The example Server_Group_to_Monitor_Group structure 1620 is stored in the mapping database 1512 of FIG. 15.

Returning to FIG. 15, the example database updater 1514 receives updates to the databases 1504-1512 from the alarm cataloger 122 and/or the configuration implementer 124. As described below, the alarm cataloger 122 collects alarm configurations from the servers 104 (e.g., collects information about the monitors 108-112 via the monitoring agents 106 on the servers 104). The example alarm cataloger 122 provides initial alarm configurations (e.g., server information, monitor information, monitor-to-server mappings, etc.) collected from the servers 104 to the database updater 1514 and provides updates to the alarm configurations based on collected updated alarm configurations (e.g., updates collected periodically, aperiodically, at particular times, in response to particular events, etc.) to the database updater 1514. The example database updater 1514 of FIG. 15 parses the updates and updates the corresponding databases 1504-1512 (e.g., the appropriate structures 1602-1620 in the databases 1504-1512).

The example database updater 1514 of FIG. 15 also receives statuses regarding pending changes to alarm configurations from the configuration implementer 124. For example, the implementation of requested changes to alarm configurations made by users of the alarm interface 116 on the servers 104 may be delayed. Delay may arise from ticketing, workflow scheduling, pending approval of the change request, and/or any other source of delay. The example configuration implementer 124 provides status updates to the example database updater 1514, which updates the appropriate statuses in the databases 1504-1512 (e.g., the status fields in the example structures 1602, 1614, 1618, 1620 and/or in the Change_History structure 1608).

FIG. 17 is a flowchart representative of example machine readable instructions 1700 which may be executed to store alarm information for a plurality of servers. The example instructions 1700 of FIG. 17 may be implemented by the example alarm linkage database 1500 of FIG. 15 to provide alarm configuration information.

The example instructions 1700 begin by determining whether alarm configuration data has been received (block 1702). For example, the database updater 1514 may receive alarm configuration data from the alarm cataloger 122 and/or the configuration implementer 124. The alarm configuration information includes, for example, monitor information for server(s) 104 in the network 102. If alarm configuration data has been received (block 1702), the example database updater 1514 stores and/or updates alarm configuration data in a monitor database (e.g., the monitor database 1506 of FIG. 15). The alarm configuration data stored in the monitor database may include information about monitors operating on the server(s) 104.

The example database updater 1514 of FIG. 15 relates the alarm configuration data to server(s) in the server database 1508 (block 1706). For example, the database updater 1514 may link the servers in the server database 1508 from which the alarm configuration information was extracted by the alarm cataloger 122 and/or the configuration implementer 124. For example, the database updater 1514 may link the data in the structures 1602-1620.

After relating the alarm configuration data (block 1706), or if alarm configuration data was not received (block 1702), the example request handler 1502 of FIG. 15 determines whether an alarm configuration update request has been received (block 1708). For example, the request handler 1502 may receive requests to update an alarm configuration of one or more servers, requests to create, edit, view, and/or delete monitor groups, server groups, and/or monitor profiles, requests to map monitor group(s) to server group(s), and/or other types of requests. If a request has been received (block 1708), the example request handler 1502 determines whether the request has been implemented (block 1710). For example, the request handler 1502 may check a status of the request in the databases 1504-1512 (e.g., in the structures 1602-1620).

If the request has been implemented (block 1710), the example request handler 1502 and/or the database updater 1514 update the monitor database 1506 and the profile database 1504 based on the request (block 1712). For example, some or all requests received via the request handler 1502 may be implemented immediately or substantially immediately, and can be reflected in the databases 1504-1512 and presented to the requester as completed. If the request is not implemented (block 1710), the example request handler 1502 updates a status of the request (e.g., a status of a change to the information in the databases 1504-1512) (block 1714). The example request handler 1502 may further present the updated status via the alarm interface 116.

After updating the request status (block 1714) or updating the monitor database 1506 and the profile database 1504 (block 1712), or if an alarm configuration update request has not been received (block 1708), the example request handler 1502 of FIG. 15 determines whether an alarm linkage database access request has been received (block 1716). An alarm linkage database access request may include, for example, a request to view a monitor, a monitor group, a server group, a monitor profile, and/or any other information stored in the databases 1504-1512 and/or the alarm linkage database 1500. If an alarm linkage database access request has been received (block 1716), the example request handler 1502 of FIG. 15 retrieves the requested data from the profile database 1504, from the monitor database 1506, from the server database 1508, and/or from the mapping database 1512 (block 1718). In some examples, the request handler 1502 may retrieve data from the KM database 1510. The request handler 1502 provides (e.g., presents) the requested data (e.g., retrieved from the databases 1504-1512) via the alarm interface 116 (block 1720). For example, the request handler 1502 may provide the requested data to the alarm interface 116, which presents a web site or other interface including the requested data.

After providing the requested data (block 1720), or if an alarm linkage database access request was not received (block 1716), control returns to block 1702 to determine whether alarm configuration data has been received. The example instructions 1700 may iterate to receive alarm configurations, receive updates to alarm configurations, and/or receive database access requests, and to handle the data and/or requests.

Figure 18:
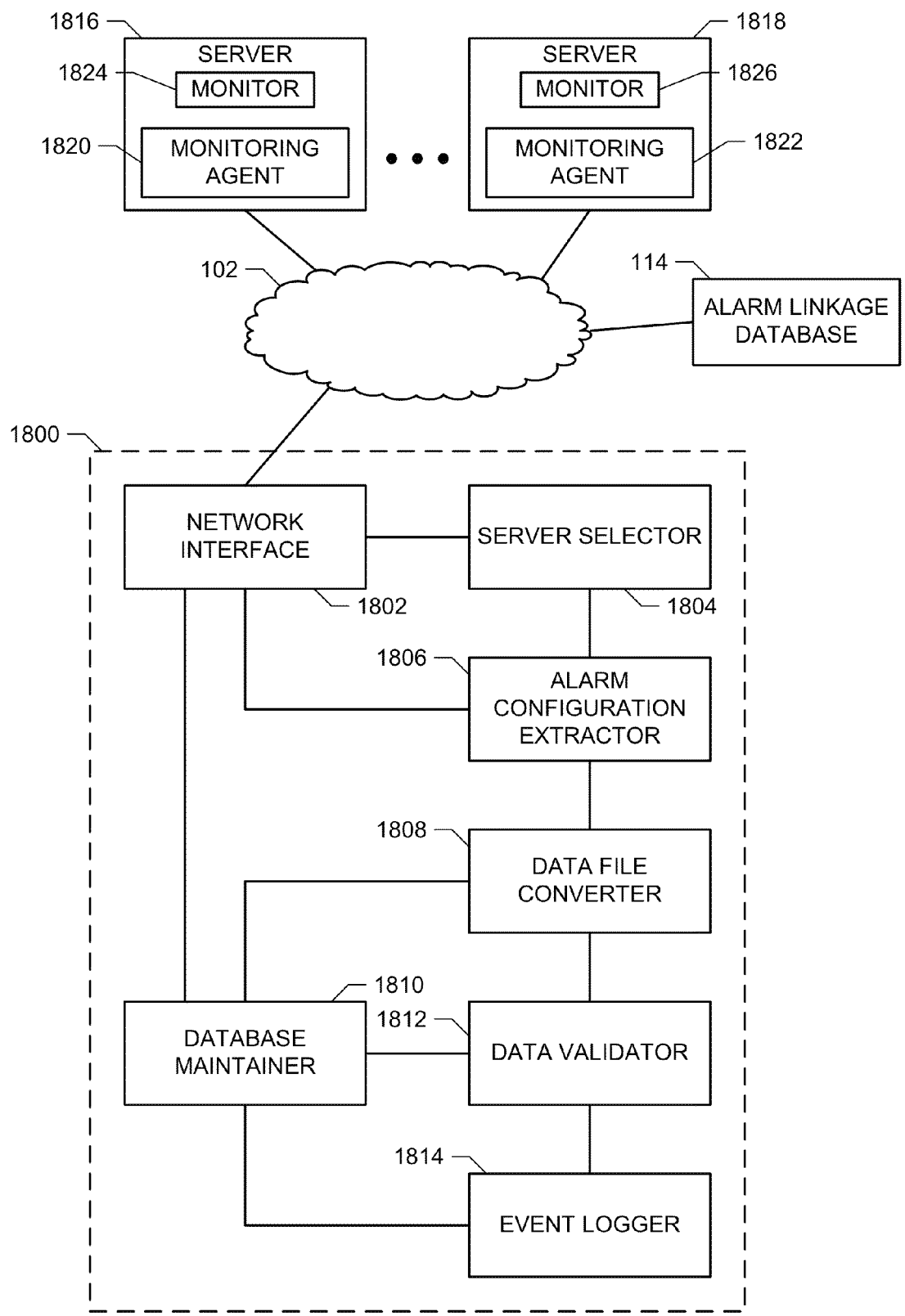
FIG. 18 is a block diagram of an example alarm cataloger.

FIG. 18 is a block diagram of an example alarm cataloger 1800. The alarm cataloger 1800 of FIG. 18 may implement the alarm cataloger 122 of FIG. 1 to collect alarm configurations from servers 104 in a network 102, process the collected alarm configurations, and store the alarm configurations in the alarm linkage database 114 and 1500 of FIGS. 1, 2, and/or 15.

The example alarm cataloger 1800 of FIG. 18 includes a network interface 1802, a server selector 1804, an alarm configuration extractor 1806, a data file converter 1808, a database table maintainer 1810, a data validator 1812, and an event logger 1814. For purposes of illustration, the example alarm cataloger 1800 is described below with reference to two servers 1816, 1818, each of which include a monitoring agent 1820, 1822 and at least one monitor 1824, 1826.

The example network interface 1802 of FIG. 18 transmits and receives commands and data to the servers 1816, 1818 and the alarm linkage database 114 via the network 102. The example network interface 1802 includes appropriate hardware to communicate via the network, such as a network interface card.

The example server selector 1804 of FIG. 18 selects a server (e.g., the server 1816) from the servers 1816, 1818 in the network 102. In some examples, the server selector 1804 maintains a list of the servers 1816, 1818 in the network 102 and the times at which the servers 1816, 1818 were most recently instructed to provide alarm configurations. In some examples, the server selector 1804 accesses the list of servers in a server database in the alarm linkage database 114 (e.g., the server database 1508 of FIG. 15). The server selector 1804 selects server(s) 1816, 1818 periodically, aperiodically, at particular times, in response to particular events, in response to a request, and/or at any other time, from which alarm configurations are to be extracted. For example, the server selector 1804 may select each of the servers 1816, 1818 in the network once per 24 hour period.

The example alarm configuration extractor 1806 of FIG. 18 instructs the monitoring agents 1820, 1822 executing on the servers 1816, 1818 to report alarm configurations. For example, when the alarm configuration extractor 1806 receives a selection of the server 1816, the alarm configuration extractor 1806 issues a command to the selected server 1816 (e.g., to the monitoring agent 1820 of the selected server 1816, via the network interface 1802) to extract and transmit the alarm configuration of the server 1816.

In response to the command from the alarm configuration extractor 1806 of the illustrated example, the example monitoring agent 1820 on the server 1816 collects the alarm configuration of the server 1816 (e.g., instances of monitors, monitored server parameters, alarm thresholds, etc.) and generates a file or package including the information and structured in a standard format, such as eXtensible Markup Language (XML). The monitoring agent 1820 of the illustrated example transmits the package to the alarm cataloger 1800. The example data file converter 1808 of FIG. 18 receives the package via the network interface 1802 and converts data files, including alarm configurations reported from the server 1816, to relational data such as data that can be used in a relational database. In the example of FIG. 18, the data file converter 1808 converts the standardized data to a data format that can be used to update the alarm linkage database 114 (e.g., the databases 1504-1512 of FIG. 15).

The example database maintainer 1810 of FIG. 18 updates the alarm linkage database 114 (e.g., the databases 1504-1512) based on the information received from the data file converter 1808. In some examples, the database maintainer 1810 retrieves alarm configuration information from the alarm linkage database 114 corresponding to the alarm configuration information from the data file converter 1808. If the database maintainer 1810 of the illustrated example determines that no updates to the alarm linkage database 114 are necessary (e.g., no changes to the alarm configuration of the server 1816 has occurred), the example database maintainer 1810 does not issue an update command. On the other hand, if the database maintainer 1810 determines that the alarm configuration information for the server 1816 needs to be updated in the alarm linkage database (e.g., the alarm configuration of the server 1816 is different than an alarm configuration for the server 1816 stored in the alarm linkage database 114).

The example data validator 1812 of FIG. 18 validates the alarm configuration data converted by the data file converter 1808. If the alarm configuration data is in correct format, the example data validator 1812 provides a confirmation of valid data to the database maintainer 1810. In contrast, if the alarm configuration data is incorrect (e.g., not correctly formatted and/or missing data), the example data validator 1812 of the illustrated example notifies the database maintainer 1810. The database maintainer 1810 awaits validation of the alarm configuration information prior to updating of the alarm linkage database 114. The example data validator 1812 further provides the validation results to the event logger 1814. The example event logger 1814 of FIG. 18 logs attempted updates of the alarm linkage database 114. The example event logger 1814 further logs instances of invalid data, including the servers 1816, 1818 from which the invalid data was received.

FIG. 19 is a flowchart representative of example machine readable instructions 1900 which may be executed to collect and store alarm configurations for a plurality of servers (e.g., the servers 104, 1816, 1818 of FIGS. 1 and/or 18). The example instructions 1900 of FIG. 19 may be performed to implement the alarm catalogers 122 and/or 1800 of FIG. 18.

The example alarm cataloger 1800 selects a server (e.g., via the server selector 1804) (block 1902). For example the server selector 1804 may select any of the servers 104 in the example network 102 of FIG. 1. The example alarm configuration extractor 1806 instructs the selected server (e.g., the server 1816 of FIG. 18) to provide an alarm configuration (block 1904). For example, the alarm configuration extractor 1806 may transmit a request or other instruction to the selected server 1816 via the network interface 1802 to cause the server 1816 (e.g., the monitoring agent 1820 on the server 1816) to collect, package, and transmit its alarm configuration as a data file.

The example data file converter 1808 converts the data file containing the alarm configuration (e.g., to a standardized format) (block 1906). Example conversions may include converting the alarm configuration from an XML format to a format that may be used to update database record(s). The example data validator 1812 verifies (e.g., validates) the converted data file (block 1908).

If the converted data file is not verified (block 1910), the example event logger 1814 logs the unverified converted data file (block 1912). On the other hand, if the converted data file is verified (block 1910), the example database maintainer 1810 stores the alarm configuration information (e.g., from the converted data file) in an alarm linkage database (e.g., the alarm linkage database 114 of FIG. 1) (block 1914).

The example server selector 1804 determines whether there are additional servers to be selected (block 1916). If there are additional servers (block 1916), control returns to block 1902 to select a server. If there are no additional servers (block 1916), the example instructions 1900 may end.

While example manners of implementing the alarm linkage database 114, the example alarm interface 116, and the alarm cataloger 122 of FIG. 1 have been illustrated in FIGS. 2, 15, and 18, one or more of the elements, processes and/or devices illustrated in FIGS. 2, 15, and/or 18 may be combined, divided, re-arranged, omitted, eliminated and/or implemented in any other way. Further, the example configuration implementer 124, the example workflow manager 126, the example security monitor 128, the example network monitor 130, the example user interface 202, the example login manager 204, the example profile manager 206, the example server manager 208, the example monitor manager 210, the example report generator 212, the example request handler 1502, the example profile database 1504, the example monitor database 1506, the example server database 1508, the example knowledge module database 1510, the example mapping database 1512, the example database updater 1514, the example network interface 1802, the example server selector 1804, the example alarm configuration extractor 1806, the example data file converter 1808, the example database table maintainer 1810, the example data validator 1812, the example event logger 1814 and/or, more generally, the example alarm interfaces 116, 200, the example alarm linkage databases 114, 1500, and/or the example alarm catalogers 122, 1800 of FIGS. 2, 15, and/or 18 may be implemented by hardware, software, firmware and/or any combination of hardware, software and/or firmware. Thus, for example, any of the example configuration implementer 124, the example workflow manager 126, the example security monitor 128, the example network monitor 130, the example user interface 202, the example login manager 204, the example profile manager 206, the example server manager 208, the example monitor manager 210, the example report generator 212, the example request handler 1502, the example profile database 1504, the example monitor database 1506, the example server database 1508, the example knowledge module database 1510, the example mapping database 1512, the example database updater 1514, the example network interface 1802, the example server selector 1804, the example alarm configuration extractor 1806, the example data file converter 1808, the example database table maintainer 1810, the example data validator 1812, the example event logger 1814 and/or, more generally, the example alarm interfaces 116, 200, the example alarm linkage databases 114, 1500, and/or the example alarm catalogers 122, 1800 of FIGS. 2, 15, and/or 18 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example configuration implementer 124, the example workflow manager 126, the example security monitor 128, the example network monitor 130, the example user interface 202, the example login manager 204, the example profile manager 206, the example server manager 208, the example monitor manager 210, the example report generator 212, the example request handler 1502, the example profile database 1504, the example monitor database 1506, the example server database 1508, the example knowledge module database 1510, the example mapping database 1512, the example database updater 1514, the example network interface 1802, the example server selector 1804, the example alarm configuration extractor 1806, the example data file converter 1808, the example database table maintainer 1810, the example data validator 1812, and/or the example event logger 1814 are hereby expressly defined to include a tangible computer readable medium such as a memory, DVD, CD, Blu-ray, etc. storing the software and/or firmware. Further still, the example alarm interfaces 116, 200, the example alarm linkage databases 114, 1500, and/or the example alarm catalogers 122, 1800 of FIGS. 2, 15, and/or 18 may include one or more elements, processes and/or devices in addition to, or instead of, those illustrated in FIGS. 3, 15, and/or 18, and/or may include more than one of any or all of the illustrated elements, processes and devices.

As mentioned above, the example instructions 1400, 1700, and/or 1900 of FIGS. 14A-14E, 17, and/or 19 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage medium in which information is stored for any duration (e.g., for extended time periods, permanently, brief instances, for temporarily buffering, and/or for caching of the information). As used herein, the term tangible computer readable storage medium is expressly defined to include any type of computer readable storage device or storage disc (e.g., a magnetic storage disc, an optical storage disc) and to exclude propagating signals. Additionally or alternatively, the example processes of FIGS. 14A-14E, 17, and 19 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable storage device or storage disc (e.g., a magnetic storage disc, an optical storage disc) and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 20:
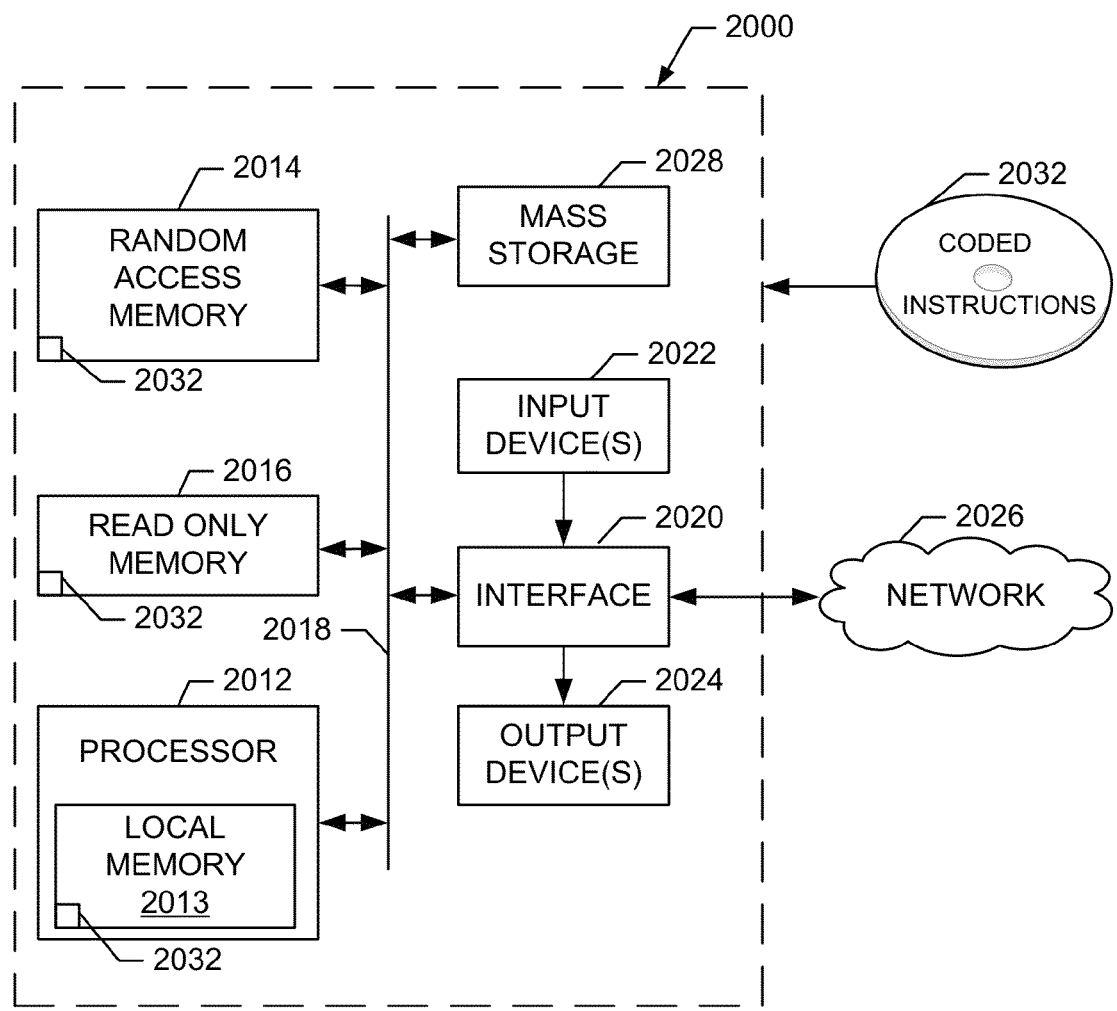
FIG. 20 is a block diagram of an example computer capable of executing the instructions of FIGS. 14A-14E, 17, and/or 19 to implement the alarm interface, the alarm linkage database, and/or the alarm cataloger of FIGS. 1, 2, 15, and/or 18.

FIG. 20 is a block diagram of an example processor platform 2000 capable of executing the instructions 1400, 1700, and/or 1900 of FIGS. 14A-14E, 17, and/or 19 to implement the alarm linkage databases 114, 1500 of FIGS. 1 and/or 15, the alarm interfaces 116, 200 of FIGS. 1 and/or 2, and/or the alarm catalogers 122, 1800 of FIGS. 1 and/or 18. The processor platform 2000 can be, for example, a server, a personal computer, or any other type of computing device.

The processor platform 2000 of the instant example includes a processor 2012. For example, the processor 2012 can be implemented by one or more microprocessors or controllers from any desired family or manufacturer.

The processor 2012 includes a local memory 2013 (e.g., a cache) and is in communication with a main memory including a volatile memory 2014 and a non-volatile memory 2016 via a bus 2018. The volatile memory 2014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2016 may be implemented by flash memory and/or any other desired type of memory device. Access to the main memory 2014, 2016 is controlled by a memory controller.

The processor platform 2000 also includes an interface circuit 2020. The interface circuit 2020 may be implemented by any type of interface standard, such as an Ethernet interface, a universal serial bus (USB), and/or a PCI express interface.

One or more input devices 2022 are connected to the interface circuit 2020. The input device(s) 2022 permit a user to enter data and commands into the processor 2012. The input device(s) can be implemented by, for example, a keyboard, a mouse, a touchscreen, a track-pad, a trackball, isopoint and/or a voice recognition system.

One or more output devices 2024 are also connected to the interface circuit 2020. The output devices 2024 can be implemented, for example, by display devices (e.g., a liquid crystal display, a cathode ray tube display (CRT), a printer and/or speakers). The interface circuit 2020, thus, typically includes a graphics driver card.

The interface circuit 2020 also includes a communication device (e.g., the user interface 202 of FIG. 2, the request handler 1502 and/or the database updater 1514 of FIG. 15, and/or the network interface 1802 of FIG. 18) such as a modem or network interface card to facilitate exchange of data with external computers via a network 2026 (e.g., an Ethernet connection, a digital subscriber line (DSL), a telephone line, coaxial cable, a cellular telephone system, etc.).

The processor platform 2000 also includes one or more mass storage devices 2028 for storing software and data. Examples of such mass storage devices 2028 include floppy disk drives, hard drive disks, compact disk drives and digital versatile disk (DVD) drives. The mass storage device 2028 may implement the databases 1504-1512 and/or the event logger 1814 of FIGS. 15 and/or 18.

The coded instructions 2032 of FIGS. 14A-14E, 17, and/or 19 may be stored in the mass storage device 2028, in the volatile memory 2014, in the non-volatile memory 2016, and/or on a removable storage medium such as a CD or DVD.

Example systems, methods, and articles of manufacture disclosed herein enable improved user efficiency when managing alarm configurations on servers in a network. Example systems, methods, and articles of manufacture enable such efficiency by assigning group(s) of monitors to group(s) of servers in a network in a few steps. Example systems, methods, and articles of manufacture also provide for more efficient viewing of alarm configurations on multiple servers by organizing monitors, monitor groups, and/or server groups within monitor profiles. Example systems, methods, and articles of manufacture provide a central location for alarm configuration information so that discrepancies between requested alarm configurations and actual alarm configurations can be rapidly identified and corrected, and by providing a single location to reference the alarm configurations.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A system, comprising:
   a processor; and
   a memory having stored thereon machine readable instructions which, when executed by the processor, cause the processor to perform operations comprising:
      receiving a request to access alarm configurations for a subset of a plurality of servers, the subset including more than one server; and
      responsive to the request:
         accessing the alarm configurations for the subset of the plurality of servers from an alarm linkage database configured to store information representative of alarm configurations for the plurality of servers;
         initiating a change in respective alarm configurations of the subset of the plurality of the servers; and
         initiating propagation of the alarm configuration to the subset of the servers including more than one server, wherein propagation of the alarm configuration is initiated to each of the servers of the subset of servers,
      wherein the alarm linkage database is configured to store a plurality of profiles, and the instructions further cause the processor to retrieve a subset of the profiles.

2. The system of claim 1, wherein the subset of the servers are monitored by respective monitors, the information representative of the alarm configurations for a first server of the subset of servers comprising an identification of a monitor associated with the first server.

3. The system of claim 1, wherein the instructions further cause the processor to assign the subset of servers to a server group, and the alarm linkage database is configured to store the server group and an identification of the servers in the server group.

4. The system of claim 3, wherein the instructions further cause the processor to initiate the change in the alarm configurations by requesting monitors to monitor the servers in the server group.

5. The system of claim 3, wherein the instructions further cause the processor to retrieve the server group from the alarm linkage database in response to a selection of a profile.

6. The system of claim 3, wherein the alarm linkage database is configured to store a plurality of server groups, a first server in a first group of servers also being in a second group of servers.

7. The system of claim 1, wherein the instructions further cause the processor to assign a plurality of monitors to a monitor group, and the alarm linkage database is configured to store the monitor group.

8. The system of claim 7, wherein the instructions further cause the processor to initiate the change by requesting a plurality of monitors in the monitor group to monitor at least one of the plurality of servers.

9. The system of claim 7, wherein the instructions further cause the processor to initiate the change by requesting the plurality of monitors in the monitor group to monitor a plurality of servers in a server group.

10. The system of claim 7, wherein the monitor group is associated with a profile, and the instructions further cause the processor to retrieve the monitor group from the alarm linkage database in response to a request specifying the profile.

11. The system of claim 1, wherein the instructions further cause the processor to modify a server group stored in the alarm linkage database.

12. The system of claim 1, wherein the instructions further cause the processor to delete a server group stored in the alarm linkage database.

13. The system of claim 1, wherein the instructions further cause the processor to modify a monitor group stored in the alarm linkage database.

14. The system of claim 1, wherein the instructions further cause the processor to delete a monitor group stored in the alarm linkage database.

15. A method comprising:
   receiving a request to access alarm configurations for a subset of a plurality of servers, the subset including more than one server; and
   responsive to the request:
      accessing the alarm configurations for the subset of the plurality of servers from an alarm linkage database configured to store information representative of alarm configurations for the plurality of servers;
      initiating a change in respective alarm configurations of the subset of the plurality of the servers; and
      initiating propagation of the alarm configuration to the subset of the servers including more than one server, wherein propagation of the alarm configuration is initiated to each of the servers of the subset of servers, wherein the alarm linkage database is configured to store a plurality of profiles, and the method further comprises retrieving a subset of the profiles.

16. The method of claim 15, further comprising assigning the subset of servers to a server group, wherein the alarm linkage database is configured to store the server group and an identification of the servers in the server group.

17. A non-transitory computer readable medium having stored thereon instructions which, when executed by a processor, cause the processor to perform operations comprising:
   receiving a request to access alarm configurations for a subset of a plurality of servers, the subset including more than one server; and
   responsive to the request:
      accessing the alarm configurations for the subset of the plurality of servers from an alarm linkage database configured to store information representative of alarm configurations for the plurality of servers;
      initiating a change in respective alarm configurations of the subset of the plurality of the servers; and
      initiating propagation of the alarm configuration to the subset of the servers including more than one server, wherein propagation of the alarm configuration is initiated to each of the servers of the subset of servers,
   wherein the alarm linkage database is configured to store a plurality of profiles, and the instructions further cause the processor to retrieve a subset of the profiles.

18. The non-transitory computer readable medium of claim 17, wherein the instructions further cause the processor to assign the subset of servers to a server group, and the alarm linkage database is configured to store the server group and an identification of the servers in the server group.

\* \* \* \* \*